US007081903B2

(12) United States Patent
McNamara et al.

(10) Patent No.: US 7,081,903 B2
(45) Date of Patent: Jul. 25, 2006

(54) EFFICIENT MOVEMENT OF FRAGMENT STAMP

(75) Inventors: Robert Stephen McNamara, Portola Valley, CA (US); Joel James McCormack, Boulder, CO (US); Laura Edwards Mendyke, Calabasas, CA (US); Todd Aldridge Dutton, Southborough, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 187 days.

(21) Appl. No.: 10/020,729

(22) Filed: Dec. 12, 2001

(65) Prior Publication Data

US 2003/0122829 A1    Jul. 3, 2003

(51) Int. Cl.
*G09G 5/00* (2006.01)
(52) U.S. Cl. .................. 345/614; 345/423; 345/441; 345/469; 345/613; 345/622
(58) Field of Classification Search ........... 345/441, 345/662, 469, 613, 614, 622
See application file for complete search history.

(56) References Cited

U.S. PATENT DOCUMENTS

| 5,446,836 | A | * | 8/1995 | Lentz et al. ............. 345/441 |
| 5,528,737 | A | * | 6/1996 | Sfarti ..................... 345/441 |
| 5,598,517 | A | * | 1/1997 | Watkins .................. 345/441 |
| 6,285,376 | B1 | * | 9/2001 | Choi et al. .............. 345/441 |
| 6,476,807 | B1 | * | 11/2002 | Duluk et al. ............ 345/421 |
| 6,504,542 | B1 | * | 1/2003 | Voorhies et al. ........ 345/441 |
| 6,731,301 | B1 | * | 5/2004 | Sato et al. .............. 345/613 |
| 6,900,803 | B1 | * | 5/2005 | Shehane et al. ......... 345/423 |

OTHER PUBLICATIONS

"Tiled Polygon Traversal Using Half-Plane Edge Functions," Joel McCormack, Robert McNamara, Compaq Computer Corp. Proceedings of the ACM Siggraph/Eurographics workshop on Graphics hardware, Interlaken, Switzerland, 2000, pp. 15-21.*

* cited by examiner

*Primary Examiner*—Matthew C. Bella
*Assistant Examiner*—Antonio Caschera

(57) ABSTRACT

A method and apparatus for visiting all productive stamp positions for a two-dimensional convex polygonal object. The object is visited with a stamp that has a stamp rectangle, and one or more discrete sample points. A productive location is one for which the object contains at least one of the stamp's sample points when the stamp is placed at that location. An unproductive location is one for which the object contains none of the stamp's sample points when the stamp is placed at that location. Stamp locations are discrete points that are separated vertically by the stamp rectangle's height, and horizontally by the stamp rectangle's width. The stamp may move to a nearby position, or to a previously saved position, as it traverses the object. The stamp moves in such a way as to visit all productive locations for an object while avoiding most of the unproductive locations.

46 Claims, 17 Drawing Sheets

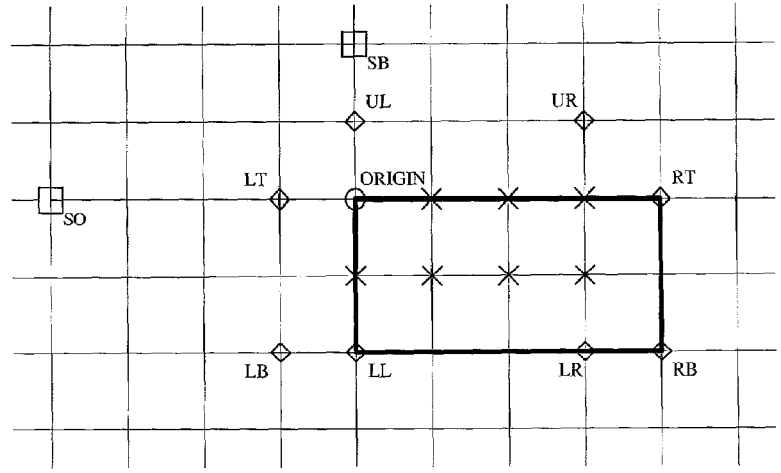

Figure 22

| Edge context |
| --- |
| Edge 0 function value |
| Edge 1 function value |
| Edge 2 function value |
| Edge 3 function value |
| Valid position bit |
| Sliver position bit |

Figure 23

| Channel context |
| --- |
| Red value |
| Green value |
| Blue value |
| Alpha tranparency value |
| Z depth value |
| Fog value |
| Texture coordinate u value |
| Texture coordinate v value |
| Texture coordinate w3 value |
| Texture coordinate q value |
| Texture derivative du/dx value |
| Texture derivative dv/dx value |
| Texture derivative du/dy value |
| Texture derivative dv/dy value |
| X coordinate value |
| Y coordinate value |

Figure 24

EFFICIENT MOVEMENT OF FRAGMENT STAMP

RELATED APPLICATION

The present application is related to co-pending U.S. patent application Ser. No. 09/934,236, entitled "METHOD AND APPARATUS FOR TILED POLYGON TRAVERSAL," filed Aug. 20, 2001, which is hereby incorporated by reference in its entirety.

FIELD OF THE INVENTION

This invention relates generally to graphics accelerators, and more particularly to graphics accelerators that use half-plane edge functions to determine whether a given (x, y) position of a pixel is within a graphic object such as a line or triangle while rendering the object.

BACKGROUND OF THE INVENTION

Fragments

A three-dimensional (3D) graphic processing device uses a description of an object such as a polygon, line, or triangle to generate the object's constituent fragments. A fragment is defined as all information required to render a single pixel that is within the boundaries of the object, for example, the x and y coordinates of the pixel, the red, green and blue color values used to modify the pixel, alpha transparency and Z depth values, texture coordinates, and the like. The graphics device must determine which fragments are contained within the object.

Half-Plane Edge Functions

A half-plane edge function fragment generator uses planar (affine) edge functions of the x and y screen coordinates. The values of these edge functions at a given pixel determine directly if the pixel is inside or outside an object, and so if a fragment should be generated for the pixel. An antialiased graphics device may evaluate the edge functions at several positions within a pixel to determine with greater precision which portions of a pixel are inside an object. Given the value of the edge functions at various points surrounding the current position, the fragment generator decides where to go next.

An introduction to half-plane edge functions is given by J. Pineda in "A Parallel Algorithm for Polygon Rasterization", *ACM Computer Graphics*, Volume 22, Number 4, August 1988 (SIGGRAPH 1998 issue), incorporated by reference herein, though the basic traversals methods described by Pineda are less than optimal.

As a very brief summary, each directed edge of an object, such as a triangle with three edges or a line with four edges, is represented as a function that partitions the 2D (x, y) rendering plane into two portions: at points to the left of the parting edge with respect to its direction, the function is negative, and at points on the parting edge or to the right of the parting edge the function is nonnegative, that is, zero, or positive.

By combining information from all edge functions at a given point, it can be determined whether the point is inside or outside the object. For example, if the three directed edges of a triangle connect in a clockwise fashion, then a point is inside the triangle if all three edge functions are nonnegative. If the three edges connect in a counterclockwise fashion, then a point is inside the triangle if all three edge functions are negative. Note that points along an edge or vertex that is shared between two or more objects should be assigned to exactly one object. The edge equations can be adjusted during setup to accomplish this.

FIG. 2 shows a triangle 200 that can be described by three clockwise directed edges 201–203, which are shown as bold arrows. The half-plane where each corresponding edge function is nonnegative is shown by the several thin "shadow" lines 210. Each shadow line 210 has the same slope as the corresponding edge. The shaded portion of FIG. 2 shows the area where all edge functions are nonnegative, i.e., points within the triangle object 200.

Fragment Stamp

One advantage of using half-plane equations is that parallel fragment generation is possible. For example, one can define a "fragment stamp" as a rectangle of stampWidth pixels by stampHeight pixels, and simultaneously compute all fragments that are within both the stamp and the object. Although fragment stamps of arbitrary size can be implemented, many computations involving the stamp can be performed with substantially less hardware if the stamp rectangle is $2^m$ pixels wide by $2^n$ pixels high. In prior art implementations, the stamp rectangle and probe points (discussed in more detail below) are essentially synonymous-the probes are located at the vertices of the stamp rectangle. More generally, though, a stamp includes three components: a rectangle, a set of sample points at which the edge functions are evaluated for generating fragment information, and a set of probe points at which the edge functions are evaluated for moving the stamp to a new location. The set of sample points and probes may overlap, that is, at some points the edge functions are evaluated both for generating fragment information and for moving the stamp.

Prior Art Traversal Algorithms

The prior art stamp movement algorithms sketched by Pineda sweep the stamp horizontally left, then right across a row "stampline," then step up or down somewhere into the next stampline. A row stampline is similar to a scanline (a row of pixels), except that a row stampline has a height equal to the height of the fragment stamp. Alternatively, the stamp can be moved vertically up and down in a column stampline, followed by stepping horizontally into the next column stampline. In this alternative, the column stampline has a width equal to the width of the fragment stamp.

The algorithms sketched by Pineda frequently allow the stamp to move outside of the object. This means that the stamp visits unproductive positions, for which it generates no fragments, then has to find its way back into the object. Thus, the Pineda algorithms frequently require many more cycles to traverse the object than an algorithm that avoids such unproductive positions.

Stamp Contexts

All traversal methods using half-plane functions require maintaining stamp contexts. A stamp context is all the information needed to place the stamp at a given position within the object. The context information includes the x and y position of the stamp, the value of all four half-plane edge evaluators, as well as the value of all channel data being interpolated from values provided at the object's vertices.

The channel data includes, for example, color, transparency, Z depth, and texture coordinates.

Determining Valid Nearby Stamp Positions

Pineda does not describe stamp movement algorithms in sufficient detail to determine what data are used to move the stamp. In particular, Pineda does not describe how to determine positions near the current stamp position to which the stamp might be moved. The stamp might move to such positions either immediately for evaluation during the next cycle, or farther in the future by saving the position in a stamp context, and eventually restoring the saved context into the current stamp position. B. Kelleher provides greater detail about determining such positions for traversal algorithms in *Pixel Vision Architecture,* Technical Note 1998-013, System Research Center, Compaq Computer Corporation, October 1998, available at http://gatekeeper.dec.com/pub/DEC/SRC/technical-notes/abstracts/src-tn-1998-013.html.

To summarize the PixelVision hardware, one corner of the fragment stamp is designated the origin, at the stamp-relative location (0, 0). The inventors therein arbitrarily make the upper left corner the origin, with increasing x values farther to the right, and increasing y values farther down. The stamp is also augmented with three probes. The term probe is not used in the PixelVision document. The term "probe" herein refers to an (x, y) location at which the half-plane equations are evaluated to assist stamp movement, rather than to determine whether a pixel (or portion of a pixel) is within the object. The probes are located at stamp-relative positions (stampWidth, 0), (0, stampHeight), and (stampWidth, stampHeight). These will be referred to as RIGHT_TOP (RT), LOWER_LEFT (LL), and RIGHT_BOTTOM (RB).

FIG. 3 shows a stamp 300 that has a rectangle 4 pixels wide by 2 pixels high. The thin lines 310 are a grid of pixels. The stamp rectangle is shown with thick solid lines. The stamp origin 320, used both for determining if the upper left pixel is in the object, and for assisting stamp movement, is circled. The other sample points 330 are used strictly for determining if the associated pixels are in the object, are shown with an X. The probes, used strictly to assist stamp movement, are enclosed in diamonds, and are labeled RT, LT, and RB. Note that the stamp rectangle's edge segments are defined as (ORIGIN, RT), (RT, RB), (RB, LL), and (LL, ORIGIN).

The movement algorithm tests each rectangle edge segment of the stamp to see if the edge segment intersects the object. A stamp rectangle edge segment intersects the object if any point along the segment is inside the object.

Testing for strict mathematical intersection of an edge segment with the object is computationally difficult. Instead, PixelVision probabilistically computes intersection semantics using two tests, which may yield a false positive. That is, the tests might sometimes indicate an intersection when an edge segment does not truly intersect the object.

The first test computes if, for each of the three or four half-plane equations used to surround a triangle or quadrilateral, at least one of the two probes at the ends of the stamp edge segment is on the inside edge of the half-plane equation. Note that this does not require that the same probe be inside each of the three or four half-plane equations, only that either or both probes be inside each half-plane equation.

FIG. 4 shows a stamp 410 and a triangle 420. The first test indicates that the object intersects the top stamp rectangle edge segment (ORIGIN, R1) because ORIGIN and RT are inside E0 and E1, and ORIGIN is inside E2. The first test indicates that the object intersects the right stamp rectangle edge segment (RT, RB) because RT is inside E0, both RT and RB are inside E1, and RB is inside E2. Likewise, the first test indicates that the object intersects the bottom and left stamp rectangle edge segments. It is easy to see that this first test will be true if a stamp rectangle edge segment intersects the object.

However this first test is also true if a stamp rectangle edge segment spans a portion of the object's shadow. The object's shadow is the set of points that are outside two edges, but inside the remaining edge(s). A stamp rectangle edge segment spans the shadow if the segment's endpoints are not in the shadow, but some point between the endpoints is in the shadow. The shaded portion of FIG. 5 shows a triangle object 500 and its shadow 510. FIG. 6 shows a triangle 610 for which the right edge segment (RT, RB) of stamp 600 satisfies the first intersection test: RT is inside E0, both RT and RB are inside E1, and RB is inside E2. However, the right edge segment of stamp 600 does not truly intersect triangle 610.

Thus, the first test for intersection with a stamp rectangle edge segment is augmented with a second test that ensures that the stamp rectangle edge segment is inside the minimal rectangular bounding box of the object, where the bounding box's edges are horizontal and vertical. If both these tests are true, then the stamp rectangle edge segment probably intersects the object. This second test eliminates the problem of indicating a false intersection for shadows associated with an object vertex that lies on one side of the minimal bounding box.

Note that object vertices that do not lie on an edge of the bounding box can still cast a false positive shadow. This does not cause any correctness problems-all productive stamp positions that intersect the object will still be visited. It does cause efficiency problems, as the false positive shadow intersection may cause the stamp to move outside the object and thus waste a cycle generating no fragments. Fortunately, efficiency suffers insignificantly. For most objects, such deceitful vertices can only occur when two edges join at an obtuse (greater than 90°) angle at some point interior to the minimal bounding box, and in such a way that the shadow cannot be spanned by horizontal and vertical stamp edge segments. For a few objects, such as X11 wide lines and OpenGL antialiased lines, computing an exact bounding box is difficult, and a graphics accelerator may instead compute a slightly larger bounding box. In these cases all four vertices of the line are inside the bounding box and thus cast a deceitful shadow. But even for these objects, the line edges meet at a 90° angle, and the shadow quickly grows beyond the size of a stamp edge segment, which can then no longer span the shadow. In nearly all cases, the stamp will move at most one position outside the object.

Moving the stamp using information only from its rectangle's four edge segments results in moving to many more positions than necessary. Often, a stamp rectangle edge segment may intersect the object, and yet moving the stamp in that direction is futile, as none of the sample points at that adjacent stamp position could possibly be within the object. For example, the triangle 420 in FIG. 4 intersects all four edges of the stamp rectangle 410, yet none of the four stamp positions above, below, left, or right of the current stamp position contains any sample points that are within the object. Such positions, for which the stamp's stampWidth by stampHeight pixel rectangle intersects the object, but none of the stamp's sample points are within the object, are called unproductive.

It would be desirable to avoid visiting as many such unproductive stamp positions as possible with a reasonable implementation cost.

SUMMARY OF THE INVENTION

The present invention relates to a method and a computer system for visiting all productive stamp locations for a two-dimensional convex polygonal object, such as might be encountered when rendering an object on a display device. The object is visited with a rectangular stamp, which contains one or more discrete sample points. A productive location is one in which the object contains at least one of the stamp's sample points when the stamp is placed at that location. An unproductive position is one in which the object contains none of the stamp's sample points. Stamp locations are discrete points that are separated vertically by the stamp's height, and horizontally by the stamp's width. The stamp may move to a nearby position, or to a previously saved position, as it traverses the object. Embodiments of the invention often avoid moving the stamp to unproductive positions.

In terms of the method, the invention uses each pair of vertices, in the order presented, to construct a directed edge between the vertices. Each directed edge is represented by an affine function of the form $E(x, y)=Ax+By+C$, in which all points to the left of the edge have a negative value, all points on the edge have a zero value, and all points to the right of the edge have a positive value. Points are considered within the object if all edge functions are nonnegative for objects described by a series of clockwise vertices, or if all edge functions are negative for objects described by a series of counterclockwise vertices. Some edge functions are effectively infinitesimally displaced from their corresponding edge, so that edges that are shared between adjacent objects assign points directly on the edge to exactly one of the objects.

The edge functions are evaluated at several points near the current stamp position. The sign bits of the edge functions at these points are combined to determine if the next position of the stamp should be one of the nearby positions, if the next position should be fetched from a previously stored context, or if all locations within the object have been visited. These sign bits are also combined to determine which, if any, of the nearby locations should be stored into their corresponding contexts.

In contrast to the prior art, which uses only four probe points at the vertices of the stamp rectangle, the present invention uses several new probe points near the stamp rectangle. These probes yield information that sometimes allows the stamp to avoid moving immediately to a nearby unproductive position. In other cases, these new probe points yield information that allows the stamp to avoid restoring a saved stamp context that would be unproductive.

In some cases, the present invention uses the additional probe points to determine that certain moves would be unproductive.

In some cases, in order to avoid unproductive positions, the invention combines information from the additional probe points with a bit that indicates whether the stamp is in the first column of the object, or at some subsequent column.

In some cases, the invention uses information gleaned from the additional probes in order to invalidate positions previously saved in a stamp context. These positions were marked as unproductive at the time they were saved. Only after visiting subsequent positions can it be determined if such saved positions need not be visited, or if these saved positions must be restored and visited in order to reach other, possibly productive positions.

Finally, in some cases, visiting unproductive positions is unavoidable, as these positions provide a path to more distant stamp positions that will generate fragments. Very thin objects may, in fact, create a "stitching" effect, in which a few sample points are in the object, the next few are not, the next few are, etc.

In another aspect of the invention, the x and y coordinates of the probes and sample points are transposed, so that the invention may traverse the object by column stamplines rather than by row stamplines, without changing the movement logic.

In another aspect of the invention, the x and y coordinates of the starting vertex are adjusted before computing the starting stamp position, so that the invention may avoid an unproductive starting position.

In another aspect of the invention, the minimal bounding box of the object is slightly reduced in size to avoid visiting stamp positions that contain a portion of the object, are unproductive because the object does not extend far enough into the object to contain any sample points, but the object's shadow is spanned by some segment that indicates the position is productive.

In another aspect of the invention, the preferred starting vertex is chosen so as to exploit the asymmetrical placement of probe points around the stamp.

In this invention, as in prior art, only the stamp positions immediately above, below, left, and right of the current position are considered to be nearby. This in not an inherent limitation of the invention, but rather an implementation issue. Allowing more positions (such as the four diagonally adjacent positions) to be considered nearby means that more logic, more gate delays, and possibly more saved contexts are involved in the decision of what position to move to next, and what nearby positions should be saved in stamp contexts. Adding more nearby positions slightly reduces the number of positions visited, at the cost of a longer cycle time. This may make the invention less efficient, by requiring more overall time to visit all productive positions within an object.

BRIEF DESCRIPTION OF THE DRAWINGS

Embodiments of the invention will be described with reference to the accompanying drawings, in which:

FIG. 22 depicts the positions for which edge function values are evaluated by the edge evaluators of the fragment generator;

FIG. 23 depicts an edge context data structure, which is generated by the fragment generator;

FIG. 24 depicts a channel context data structure, which is generated by the fragment generator;

DESCRIPTION OF PREFERRED EMBODIMENTS

System Overview

Figure 1:
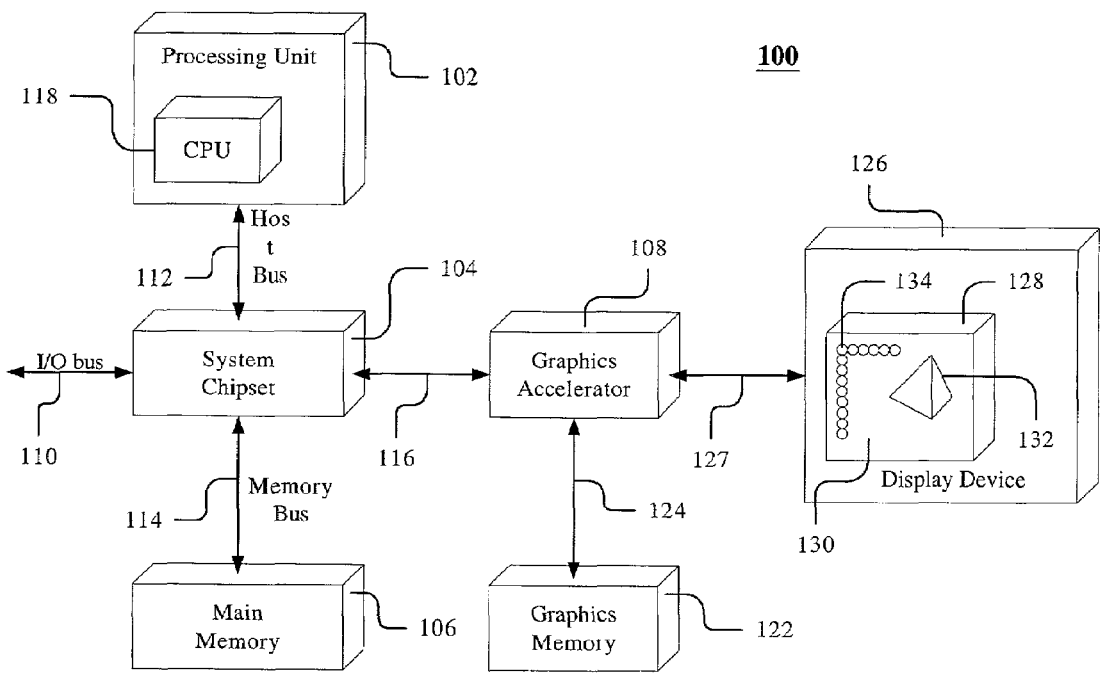
FIG. 1 is a block diagram of a graphics processing system that can use the efficient polygon traversal according to the invention.
Figure 2:
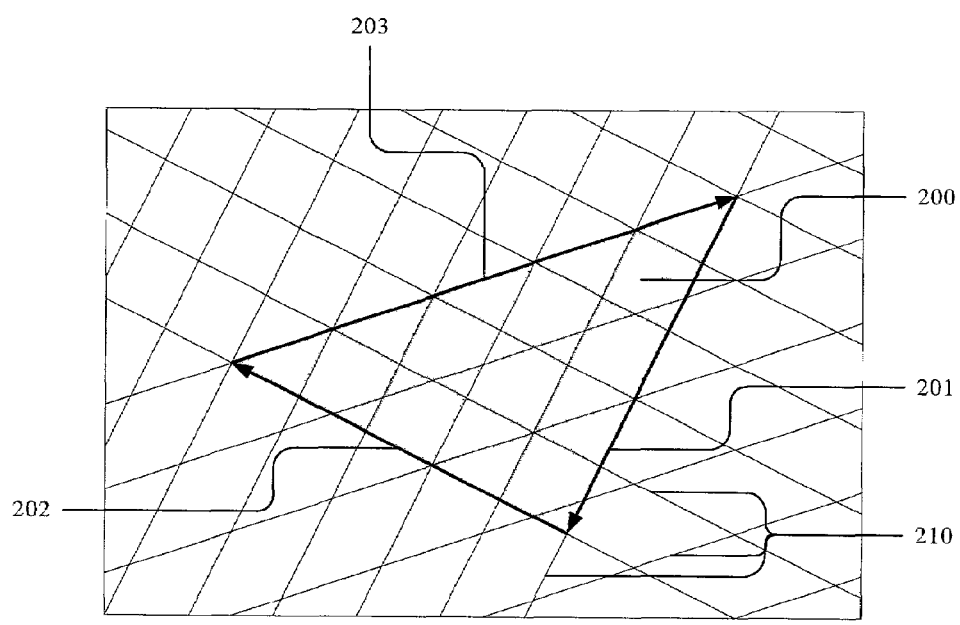
FIG. 2 is a diagram of a triangle with associated half-plane edges.

FIG. 1 shows a computer system 100 embodying the principles of the invention. The system 100 can generate monochrome or multicolor 2-D and 3-D graphic images for rendering on a display device. In the computer system 100, a system chip set 104 provides an interface among a processing unit 102, a main memory 106, a graphics accelerator 108, and devices (not shown) on an I/O bus 110. The processing unit 102 is coupled to the system chip set 104 by the host bus 112 and includes a central processing unit (CPU) 118. The main memory 106 interfaces to the system chip set 104 by bus 114.

The graphics accelerator 108 is coupled to the system chip set 104 by a bus 116, to a graphics memory 122 by a bus 124, and to a display device 126 by a bus 127. The display device 126 includes a raster display monitor 128 for rendering color images on, for example, a display surface or screen 130. The invention can also be practiced with a monochrome monitor that displays gray-scale images, with a printer that prints black and white or color images, or with any other pixel-based output device such as a liquid-crystal or dot matrix displays.

The rendering surface 130, for example, a display screen, includes a 2-D array of data elements called pixels and produces an image 132 by illuminating a particular pattern of those pixels 134. Conventionally, the pixels have (x, y) Cartesian coordinates. The image 132, for example, can be 2-D alphanumeric characters or a 3-D scene filled with objects.

The graphics memory 122 includes storage elements for storing an encoded version of the graphical image 132. There is a direct correspondence between the storage elements and the pixels 134 on the display screen 130. The values stored in the storage elements for a particular pixel, referred to as pixel data, control the intensity of the particular pixel 134 on the screen 130.

General Operation

During operation, the processing unit 102 can issue graphics commands requesting that a complex graphical object be rendered into an image 132. The processing unit 102 first tessellates the graphical object into primitive objects such as triangles, lines, or quadrilaterals, or into lists of such primitives. Each primitive directly or indirectly specifies a convex polygon of three or more sides. The chip set 104 sends graphics commands specifying such primitives to the graphics accelerator 108, which executes the commands, converting the primitive objects into fragments.

A fragment is the information associated with a 2-D polygon created by clipping a convex polygonal primitive of the image 132 to the boundaries of a pixel. Fragment information includes the x and y coordinates of the pixel; in this description, x coordinates increase from left to right, and y coordinates increase from top to bottom. Fragments also include channel information that is interpolated from values provided at the primitive's vertices, such as the red, green, and blue color values of the primitive object at that location, alpha transparency, Z depth value, texture coordinates, and the like.

The graphics accelerator 108 merges or replaces existing pixel data with data from the fragments, and loads the pixel data corresponding to the fragments into the appropriate storage elements of the graphics memory 122.

An important operation of the graphics accelerator 108 during graphics rendering is to determine which fragments are contained within a convex polygonal object. The graphics accelerator 108 initially positions a fragment stamp (preferably having a $2^m$ pixel wide by $2^n$ pixel high rectangle) so that the stamp rectangle contains one vertex of the object. Typically, the stamp is aligned to an x and y position that is a multiple of the stamp's width and height, respectively, while the vertices are specified to subpixel precision. The initial position of the stamp is computed by setting the appropriate number of lower bits of the starting vertex's (possibly adjusted) x and y coordinates to zero. Though the detailed methods below can start at any vertex on the edge of a minimal bounding box, for simplicity of description, most examples described herein starts at the left-most vertex of the object.

Edge functions are evaluated at several points on or near the stamp, yielding information about which nearby stamp positions probably contain portions of the object (i.e., fall at least partially within the boundary of the object). This information is used to determine nearby stamp positions to be visited immediately or sometime later. For the various embodiments of the invention described herein, the nearby stamp positions considered are the "Manhattan" stamp positions, which are directly left, right, up, and down from the current position. It will become apparent that the methods described herein can be extended to consider diagonally adjacent stamp positions or even nonadjacent positions, in order to visit even fewer nonproductive stamp positions that generate no fragments. However, the extra circuitry required for non-Manhattan movement may increase overall cycle time so much as to outweigh the small reduction in the number of moves used to traverse an object.

A nearby stamp position is valid if the traversal logic or process considers it a plausible candidate for visiting, and invalid if the position is not a candidate. Valid positions are those for which the stamp rectangle probably contains a portion of the object, and may have a sample point contained by the object. Valid positions are determined by approximating the mathematical intersection of a line segment between two of the probe points with the graphics object. Higher efficiency in fragment stamp movement is achieved when many unproductive positions are classified invalid, and hence not moved to.

More complex implementations of the graphics accelerator 108 evaluate the edge functions at more points, and thus are able to classify some valid positions as slivers. A sliver position is a valid position which the traversal logic or process determines will nonetheless not generate any fragments, and determines that all stamp positions further on in the direction of the sliver position from the current position will also not generate any fragments. The embodiments described detect such slivers if the object lies completely to one side of all the sample points in the stamp. Movement to sliver positions can often, but not always, be avoided if a more promising valid position is available. Higher efficiency in fragment stamp movement is achieved when many sliver positions are avoided.

Figure 7:
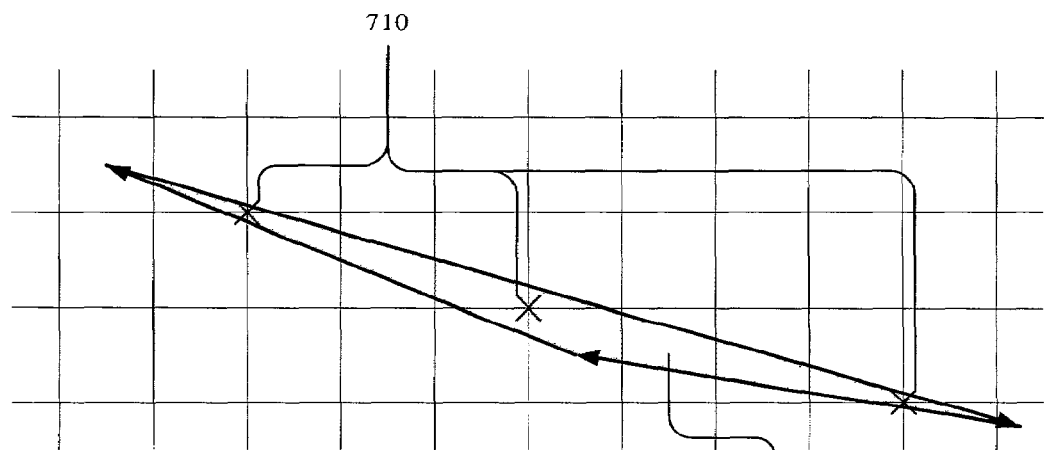
FIG. 7 is a diagram of a thin triangle that covers a few widely spaced non-contiguous sample points.

In some instances, visiting unproductive positions is unavoidable, as these positions provide a path to more distant stamp positions that will generate fragments. FIG. 7 shows such an example, where only three widely-separated fragments 710 marked with an X are contained in the triangle 700. In this case, it may be necessary to move through unproductive stamp positions to reach the fragments 710.

Movement of the stamp can be either directly to a nearby position (e.g., adjacent to the current stamp position), or by restoring a previously saved stamp context. The method also determines what nearby positions (if any) should be saved to the corresponding stamp contexts.

Example of Order of Traversal Using Bidirectional Movement in Stamplines

Two simple traversal algorithms that use extra probe point data are shown below. These are simplified, non-tiling versions of the more sophisticated traversal algorithms described in the above-referenced U.S. patent application. These simple algorithms initially position the fragment stamp near one vertex of the object, for example, the leftmost vertex. The stamp is initially positioned such that its rectangle is aligned to an (x, y) position that is a multiple of the stamp's width and height, and it encloses the starting vertex.

In the first traversal algorithm (also referred herein as a bidirectional movement algorithm), movement in each stampline first proceeds in one direction, then in the opposite direction. For later consistency of reference in computing the validity and sliver status of nearby positions, a stampline is considered to be (multiple) columns of pixels in this method. The column's width is equal to the stamp's width. This bidirectional movement algorithm could, naturally consider a stampline to be (multiple) rows of pixels.

This bidirectional movement algorithm uses three stamp contexts: the current context, as well as backSave and overSave saved contexts. A stamp context contains all the information needed by a graphics processor to place the stamp at a given position.

If the position above the starting position is valid, then that position is saved in the backSave stamp context.

The method moves to all valid stamp positions below the starting position, if any exists, then restores the backSave context and visits all valid positions above the starting position. When a context is restored, it is copied into the current context. Restoring a context also empties the restored context (or, equivalently, invalidates the restored context); a new position must be stored in the context before it can be restored again. If the backSave context is empty, that is, there was no valid position above the first position in the column stampline, this step is skipped.

As the stamp visits each position in the column stampline, also examined is the position in the column stampline immediately to the right of the current position. The first such valid position is saved in the overSave context.

When the stamp has finished visiting all positions on the current column stampline, the stamp then moves right to the overSave position in the next stampline. That is, the graphics accelerator restores the overSave context by copying it into the current context and invalidating the overSave context. The graphics accelerator repeats the process of storing into backSave the position above the first position in the new stampline if that position is valid, visiting all the valid positions below, restoring the backSave context (if valid) and visiting all the valid positions above, and then moving to the next stampline to the right by restoring the overSave context. When the stamp has no positions farther to the right to visit (i.e., when it attempts to restore overSave, but that context is empty), the graphics accelerator is finished traversing the object.

In the bi-directional movement algorithm, whenever a valid over or overSave position exists, the algorithm never moves to a forward, back, or backSave position that was determined to be a sliver. By definition, sliver positions can never lead to a valid position within the current stampline, and so the algorithm moves over to the next stampline as soon as possible. Such sliver positions are visited only if there is no valid position in the next stampline over. In this case, sliver positions must be visited, as they may lead to a position in the current stampline for which there is a valid position in the next stampline over.

Bypassing Saved Contexts

In this and some embodiments of the invention discussed below, bypassing is used to avoid the time required to save a nearby stamp position in one cycle, and then immediately load that saved context in the next cycle. For example, if the first stamp position in a stampline has no valid position to visit below, then for the next cycle the stamp immediately proceeds to the valid position above, rather than taking one cycle to save the above position in backSave, and another cycle to restore it from backSave into the current context.

Similarly, if the position to the right is valid and overSave is empty when all locations in a stampline have been visited, then the graphics accelerator immediately moves the stamp right to the next stampline rather than saving the position in overSave and then restoring that position on the next cycle.

As can be seen in the detailed descriptions, bypassing increases the complexity of the traversal logic and process. For clarity, the summaries of each method always refer to saving and restoring a context, even when the implementation actually bypasses the saved context for efficiency.

Figure 8:
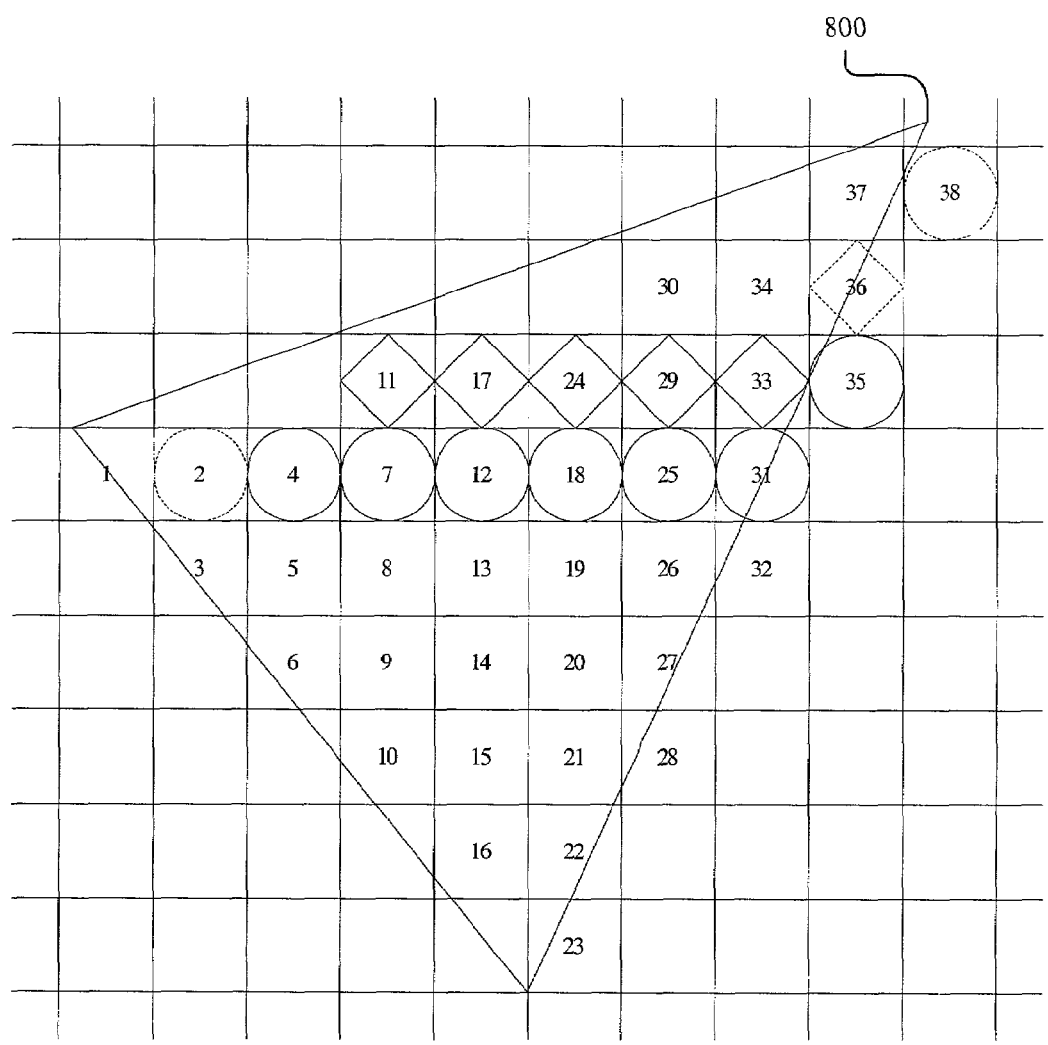
FIG. 8 is a diagram of the order in which the stamp traverses an exemplary triangle.

FIG. 8 depicts the order in which the fragment stamp moves when traversing a triangle 800. For simplicity, the fragment stamp is a single pixel wide and high. It should be apparent that arbitrary stamp sizes can be used. A pixel is considered to be inside the triangle if the upper left corner of its square is inside the triangle. This positioning of the sample point at the upper left corner makes implementing the computation of the edge functions simpler, and is an arbitrary choice. Each pixel inside the triangle has been labeled with a number showing the order in which pixels are visited.

Each back position above the first position on each stampline that was saved into backSave and then later restored is enclosed in a solid diamond. Each back position that was immediately bypassed directly into the current context is enclosed in a dashed diamond. Each over position to the right of the stampline that was saved into backSave and then later restored, or was immediately bypassed, is enclosed in a solid or dashed circle, respectively.

Note that the stamp moves from position 36 to position 37, which is a non-productive position. This non-productive move is needed to get from position 36 to position 38, which is productive. Note further that without the improvements enabled by additional probe points, the stamp would visit every pixel square which is fully or partially covered by the object, even if the object does not include the upper left corner of the pixel.

Example of Order of Traversal Using Unidirectional Movement in Stamplines

In an alternate embodiment of the invention, the order in which stamp positions are visited is altered by giving precedence to moving in the over (right or left) direction before moving in the forward or back direction. This different traversal order moves the stamp across each stampline in the same direction, rather than first in one direction and then the opposite direction. This ordering offers no advantages over the above embodiment for the purposes of this disclosure, and in fact reduces efficiency by more frequently moving to over positions that are not productive. (Even for very small triangles, where this effect is largest, the efficiency loss is under 1%.) In exchange, this traversal order offers substantial advantages in reducing the number of contexts and decision-making complexity required when tiling constraints are added, as described in the aforementioned patent application.

This method again uses three stamp contexts: the current context, as well as backSave and forwardSave saved contexts. In this alternate embodiment, again suppose that the algorithm chooses the leftmost vertex of the object. Rather than generating stamplines that are (multiple) columns of pixels, the present method generates stamplines that are (multiple) rows of pixels.

The method first generates all fragments in the row stampline to the right of the starting position. As it visits each position in this row, the fragment stamps also looks for valid positions in the row stamplines above and below, and saves the first of each in backSave and forwardSave, respectively.

When the stamp has visited all valid positions in the row stampline, it then starts at the forwardSave position in the row below, by restoring forwardSave into the current stamp position. The stamp then visits all valid positions in that row, while looking for the first valid position farther below to store into forwardSave. It continues to restore forwardSave and traverse each row stampline until forwardSave is empty when an attempt is made to restore it. At this point, the stamp has visited all positions in the object that are in or below the starting stampline.

The stamp then moves to the position that was saved above the first stampline, by restoring the backSave context into the current stamp position. It visits all valid positions in that row stampline, saving a valid backSave position if it can find one, restoring backSave and generating the next row above, etc. When there is no valid position stored in backSave to restore, then all valid positions within the object have been visited, and object traversal is complete.

This algorithm also attempts to avoid sliver positions, but the different traversal order requires somewhat different rules. Again, whenever a valid over position exists, the algorithm never moves to a forward, forwardSave, back, or backSave position that is adjacent to the current stampline and which was determined to be a sliver. By definition, such moves can never lead to a valid position in the current column—they can only lead to a valid position in the next column over. But such a valid position will also be found if the algorithm moves to the over position. These sliver positions are visited only if over is not valid. If over is a sliver, and a valid non-sliver forward, forwardSave, back, or backSave position exists, these take precedence over the over sliver. Again, by definition there will be no more productive positions in the current stampline, and so there is no point continuing in the over direction. Also, a valid non-sliver forward position should overwrite a sliver forwardSave position, and the same for back and backSave.

Figure 9:
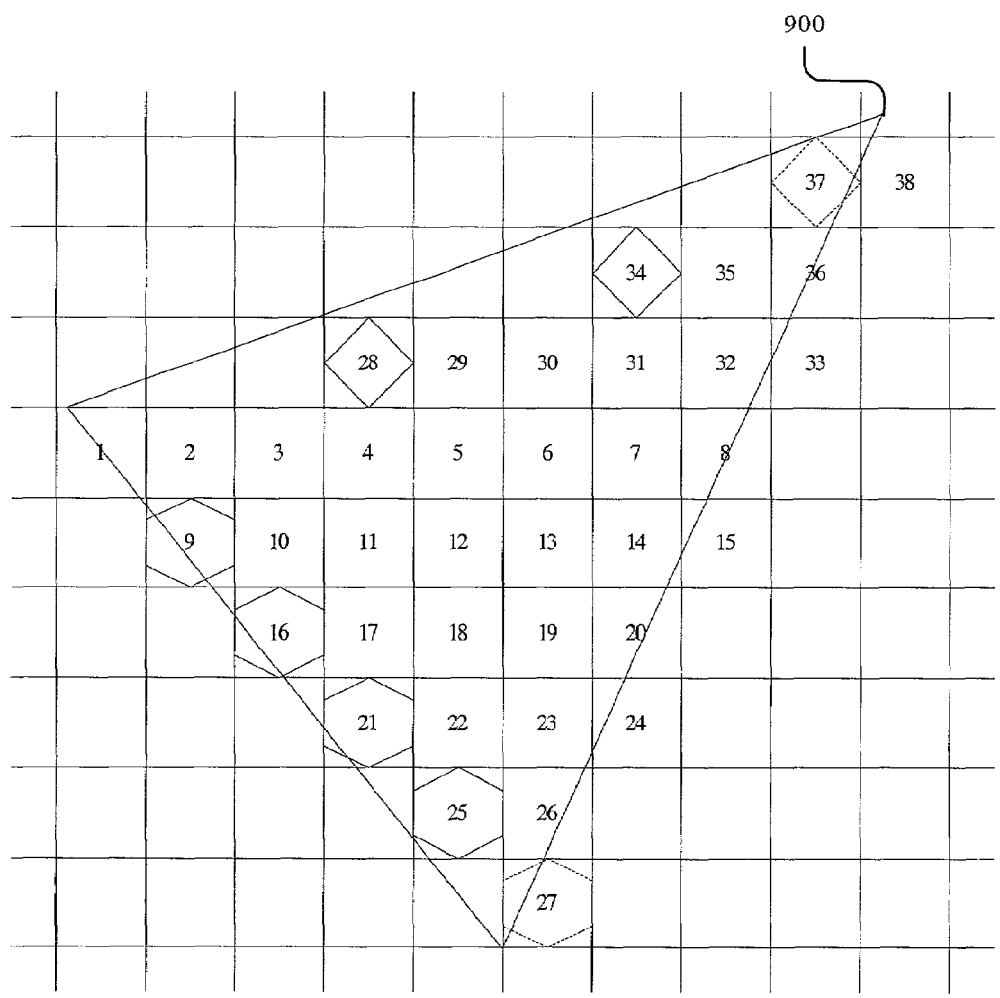
FIG. 9 is a diagram of the order in which an alternative embodiment traverses the same triangle as shown in FIG. 8.

The behavior of this algorithm is shown for the exemplary triangle 900 in FIG. 9. Again, each pixel has been labeled with a number showing the order in which it was visited. In this example the forwardSave positions are shown in solid and dashed hexagons, and the backSave positions are shown in solid and dashed diamonds, where dashes indicate that a context is bypassed.

Implementation Details

Figure 17A:
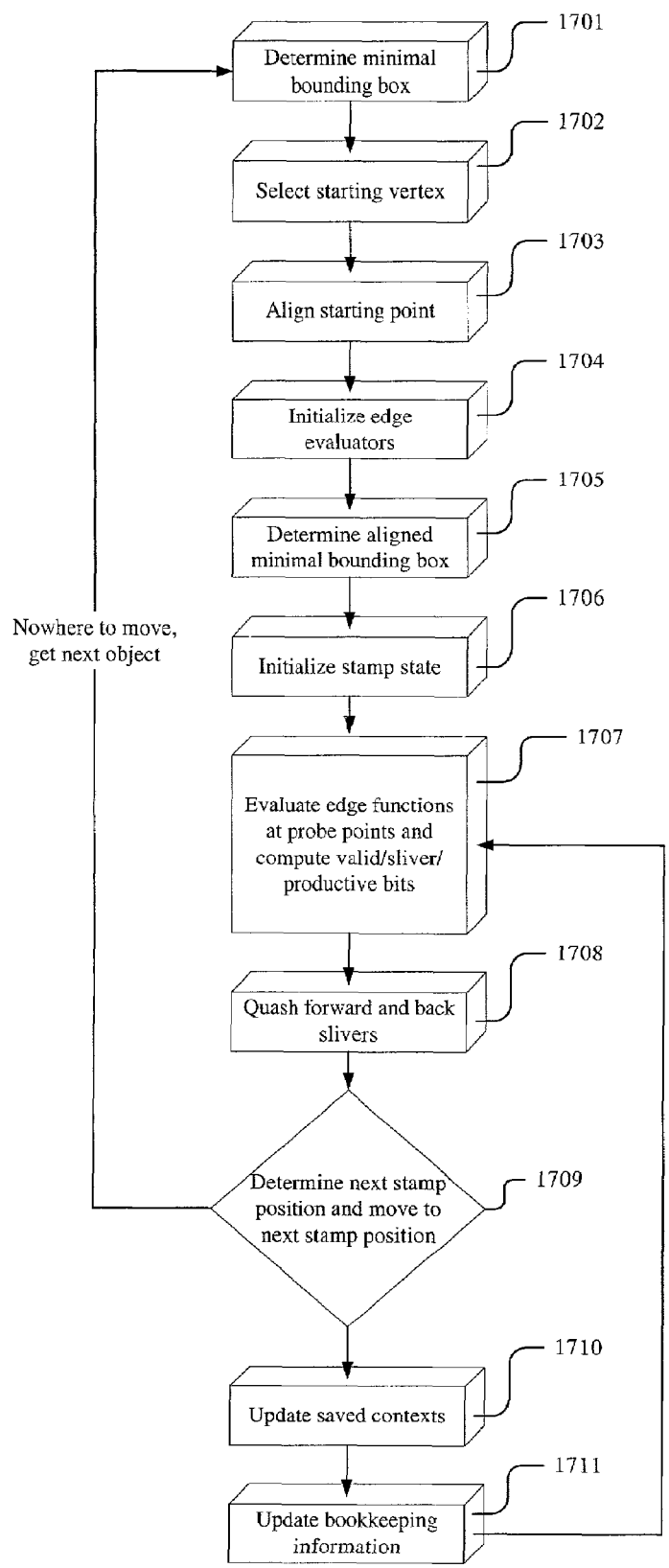
FIG. 17A is a flow diagram for a fragment stamp traversal method according to one embodiment of the invention.

The principle steps for the traversal methods according to the invention are shown in FIG. 17A. The steps are implemented by circuits and software of the graphics accelerator 108 of FIG. 1, which are shown in more detail in FIGS. 20 and 21.

Additional Probe Locations

Avoiding unproductive stamp positions requires evaluating the edge functions at more locations than the four locations of prior art. In particular, according to the present invention, unproductive stamp positions are avoided by evaluating edge functions at probe points outside the stamp's rectangle. In a preferred embodiment, the stamp's rectangle is defined to be a rectangle of stampWidth pixels by stampHeight pixels, where all fragments that are within both the stamp and the object to be rendered are computed simultaneously. In the preferred embodiment, the possible locations where the fragment stamp can move to are contiguous but non-overlapping. Thus, in the preferred embodiment, probe points outside the stamp's rectangle when the stamp is at one stamp location will be inside the stamp's rectangle only when the stamp is at an adjacent stamp position.

Figure 3:
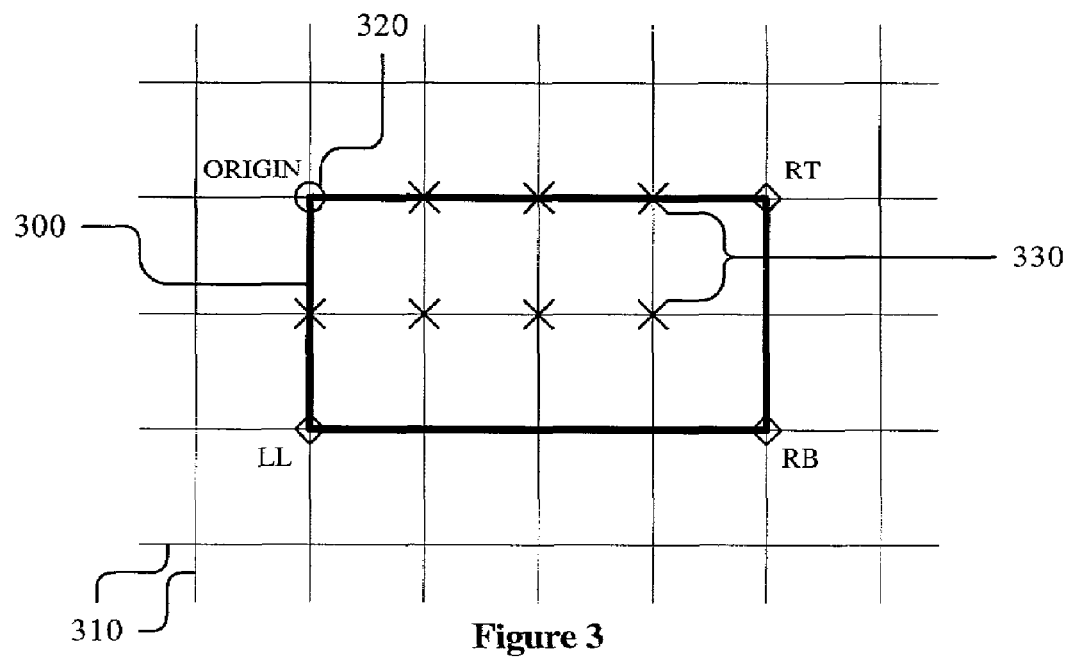
FIG. 3 is a diagram of a prior art fragment stamp with a minimal number of probes.
Figure 26:
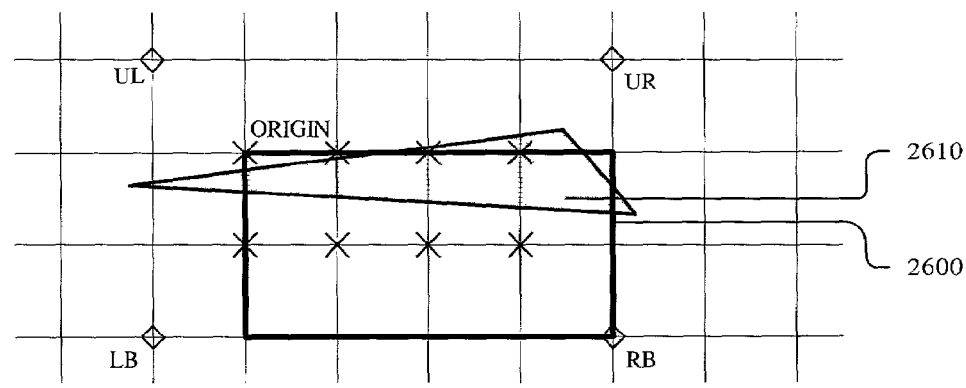
FIG. 26 depicts a fragment stamp with four probe points arranged as a rectangle larger than the stamp rectangle.

A simple scheme might evaluate probes that still form a rectangle, albeit larger than the stamp's rectangle. FIG. 26 shows such a scheme for a stamp rectangle 2600. The prior art placement of probe points shown in FIG. 3 has been extended upward and leftward. RT has been moved upward one pixel, and LL has been moved leftward one pixel. A new probe point UPPER_LEFT (UL) has been added in the upper left corner. The computation of valid positions is similar to prior art, but the segment (UL, UR) is tested instead of (ORIGIN, UR), and the segment (LB, UL) is tested instead of (LB, ORIGIN).

Such a scheme does avoid some unproductive positions. For example, if an object extends less than one pixel above the stamp, as does triangle 2610, this larger probe rectangle in some cases prevents the stamp from moving up to the unproductive position above stamp position 2600. However, there are still many situations in which such an augmented stamp will move to unproductive positions. Such positions cannot be avoided by pushing the probe points out even farther from the stamp rectangle. Probe points cannot be moved so far that the segments being tested will include sample points from nearby stamp positions, otherwise possibly productive positions will not be considered valid positions to which to move.

Figure 10:
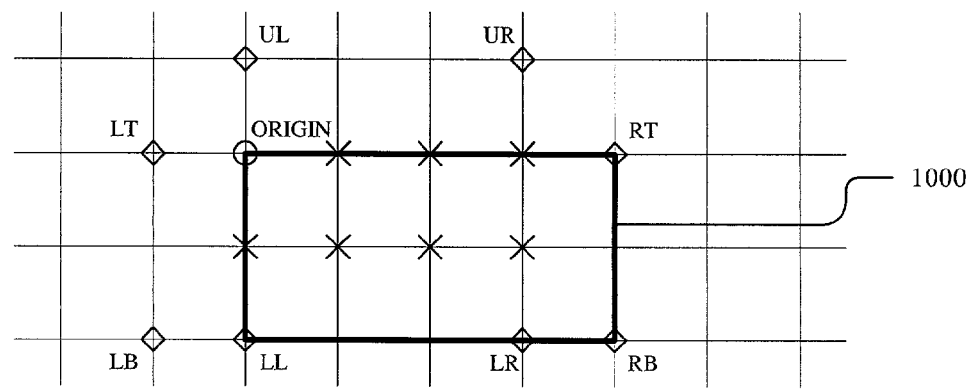
FIG. 10 is a diagram of a fragment stamp augmented with several probes.

Instead, many more unproductive positions can be avoided by adding several probe points, carefully positioned around the stamp rectangle to extract a large amount of information about nearby positions. FIG. 10 illustrates a 4 pixels wide by 2 pixels high fragment stamp rectangle 1000 with additional probes that surround the stamp, where SU (described momentarily) is one pixel. The probes and their position relative to the upper left corner of the stamp rectangle are shown in the table below. SU is the smallest unit in the grid that sample points lie on. This grid is usually of equal or coarser grain than the grid in which vertex coordinates are specified. For aliased drawing, a pixel is either in the object or not in the object, and SU is 1 pixel. For supersampled antialiased drawing, a pixel may be partially covered by the object, and this coverage is represented by a bit string of several sample points within each pixel, where each sample point is either in or not in the object. In this case, the sample points are positioned upon a subpixel grid. If sixteen sparse sample points are used, this grid might be 1/16 of a pixel, and so SU would also be 1/16 of a pixel. The probe points are described in the table below.

| PROBE POINT | X OFFSET | Y OFFSET |
| --- | --- | --- |
| ORIGIN | 0 | 0 |
| LEFT_TOP (LT) | – SU | 0 |
| UPPER_LEFT (UL) | 0 | – SU |
| UPPER_RIGHT (UR) | StampWidth – SU | – SU |
| RIGHT_TOP (RT) | StampWidth | 0 |
| LEFT_BOTTOM (LB) | – SU | StampHeight |
| LOWER_LEFT (LL) | 0 | StampHeight |
| LOWER_RIGHT (LR) | StampWidth – SU | StampHeight |
| RIGHT_BOTTOM (RB) | StampWidth | StampHeight |

This placement of probe points assumes that antialiased sample points are placed with some degree of regularity, in that each row and column of the grid contains one sample point. If a less regular pattern of sample points is used, the position of the probe points may need to be adjusted slightly. The segments between probe points that are tested in the methods described below should extend as far out from the stamp as possible, without extending so far as to allow an object to contain a sample point but not intersect the appropriate segments. If, for example, an antialiased arrangement did not place any sample points on the bottom-most row of the grid, the UL and UR probe points y offset from the origin could be increased to –2 SU.

The alternative implementation (using unidirectional movement in stamplines) can be improved slightly by using two more probe points, which are described in the table below:

| PROBE POINT | X OFFSET | Y OFFSET |
| --- | --- | --- |
| LEFT_MIDDLE | – SU | StampHeight – SU |
| RIGHT_MIDDLE | StampWidth | StampHeight – SU |

Note that only one of these probes is active for the traversal of a given object. Thus, these two additional probe points can be implemented by multiplexing the appropriate values into a single adder.

Figure 4:
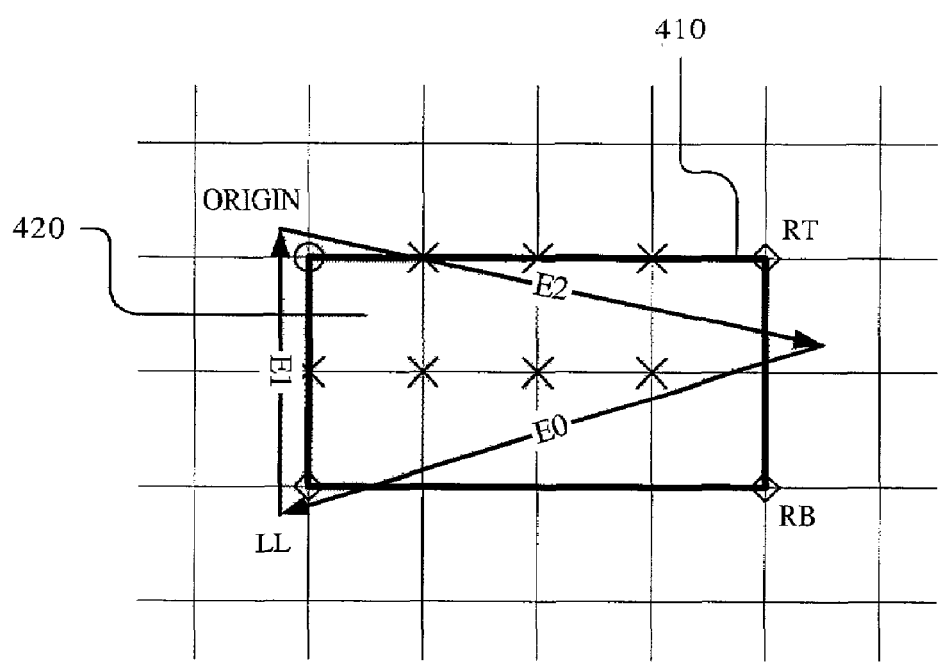
FIG. 4 is a diagram of a triangle which intersects all of the stamp's edge segments.
Figure 5:
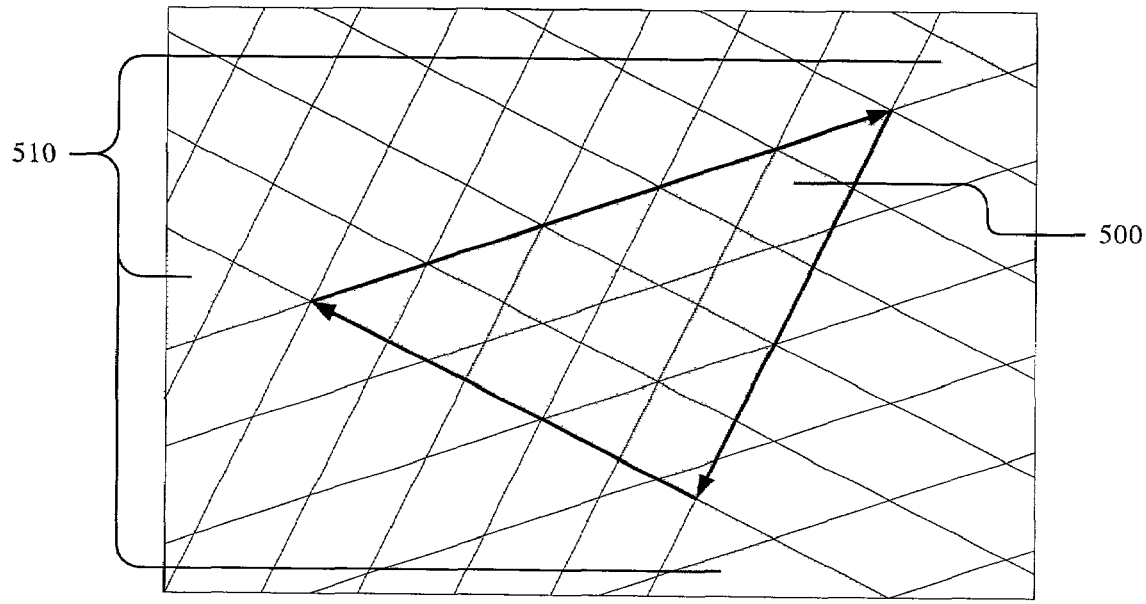
FIG. 5 is a diagram of a triangle and its shadow.
Figure 6:
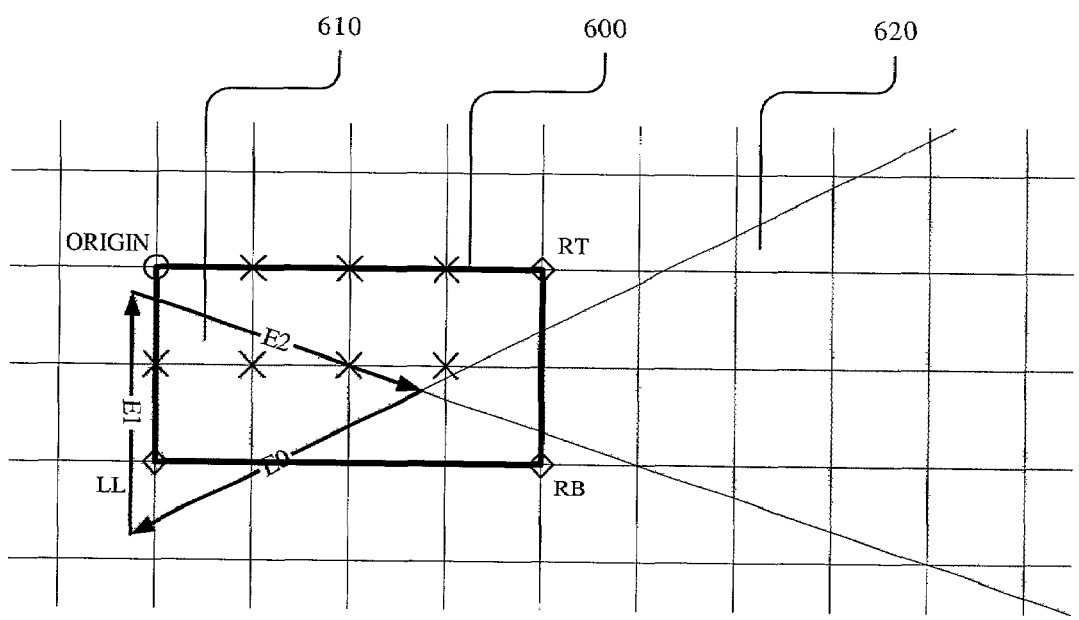
FIG. 6 is a diagram of a stamp edge segment that satisfies the first intersection test even though the segment is outside the object.

In some cases, these additional probe points do not provide sufficient information to avoid some moves to unproductive positions. FIG. 4 provides an example. Although the triangle 420 intersects the right edge (RT, RB) of stamp 410, the triangle slips between the two left-most sample points of the stamp position to the right, that is, the grid point RT and the grid point immediately below RT. Correctly avoiding moving to the position to the right is much more involved than avoiding the position to the left of the stamp. For example, a slightly different triangle might slip through the same two left-most sample points of the stamp position to the right, but nonetheless enclose a sample point even farther to the right.

Detecting such cases requires adding many more probe points. However, while probe points are relatively cheap in implementation cost, they are not free. Of more concern is the minimum cycle time required to move the stamp. The more probe points used, the more information has to be combined before moving the stamp, which in turn increases gate delays. Because stamp movement cannot be pipelined, it may well prove one of the critical delay paths in a design, and so this increased gate delay may translate to a longer cycle time. In this case, adding more probe points may make the stamp more "efficient" measured in the number of cycles it takes to generate all fragments within an object, but less efficient measured in the time it takes to generate the fragments due to the increased cycle time.

Transposed Probe Points

The following discussion will be in terms of up being back, down being forward, and left or right (depending if the starting position was the right-most or left-most vertex) being over. The stamp algorithms also work for left being back, right being forward, and up or down being over, by transposing the probe points. Here, transpose means computing the probe offsets by swapping the roles of x and y offset columns, and by swapping the roles of StampWidth and StampHeight in the swapped columns, as shown for the stamp 1100 in FIG. 11 and in the following table. (The probe names no longer make much sense when they are transposed.) This transposition forces the movement algorithm to reverse the roles of rows and columns without any changes to the algorithm, and thus avoids additional gate delays in the movement logic. The transposed probe points are described in the table below.

| TRANSPOSED PROBE POINT | X OFFSET | Y OFFSET |
|---|---|---|
| ORIGIN | 0 | 0 |
| LEFT_TOP (LT) | 0 | − SU |
| UPPER_LEFT (UL) | − SU | 0 |
| UPPER_RIGHT (UR) | − SU | StampHeight − SU |
| RIGHT_TOP (RT) | 0 | StampHeight |
| LEFT_BOTTOM (LB) | StampWidth | − SU |
| LOWER_LEFT (LL) | StampWidth | 0 |
| LOWER_RIGHT (LR) | StampWidth | StampHeight − SU |
| RIGHT_BOTTOM (RB) | StampWidth | StampHeight |
| LEFT_MIDDLE | StampWidth − SU | − SU |
| RIGHT_MIDDLE | StampWidth − SU | StampHeight |

Probe point transposition can be accomplished in one of two ways, depending upon the number of sample points vs. the number of probe points, and cycle time constraints. The probe points can be moved by multiplexing different offsets into the adders that compute the edge functions at each probe point. This adds multiplexors into the path required to compute the edge functions at the probe points, which in turn increases the time required to move the stamp.

Alternatively, the roles of x and y can be swapped during the setup of the edge evaluators, so that no additional multiplexing is required to transpose the probe points. However, note that sample points should not be transposed. This scheme in general requires multiplexing different values into the sample point adders, depending on if probes are transposed or not. As a special case, if the stamp is a square and the set of sample points is symmetrical around the (x, y) diagonal, the mask of sample points bits output from the sample point computation logic can be multiplexed. In either case, multiplexing the inputs or outputs of the sample point computation logic probably does not increase the cycle time of the stamp, as these values are not subject to further computation by the stamp movement logic. (The exception is the ORIGIN, which fortunately needs no multiplexing nor adders to compute.)

Alternatively, the stamp can be surrounded by additional probe points, which evaluate the union of the set of non-transposed probe points and the set of transposed probe points. In this case, movement algorithms similar to those described here can be derived by one skilled in the art, in which one subset of the union set of probes is used to traverse row stamplines, and another subset is used to traverse column stamplines. Again, though, this technique requires additional multiplexors in the stamp movement decision making logic, and so may increase the time required to move the stamp.

Coincident Probe Points

Figure 12:
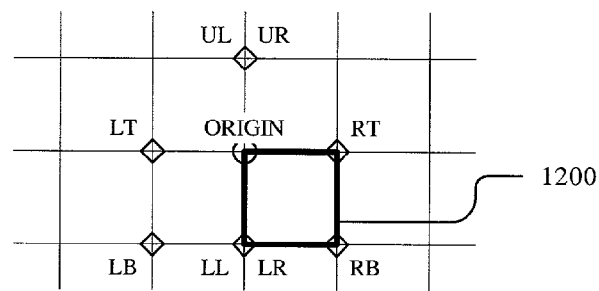
FIG. 12 is a diagram of coincident probes in a one pixel by one pixel fragment stamp.

If the stamp is one pixel wide (or one pixel high using the transposed probe points), and the sampling grid unit SU is also one pixel, some of the probe points become coincident (that is, occupy the same location). In particular, UPPER_LEFT and UPPER_RIGHT become coincident, and LOWER_LEFT and LOWER_RIGHT become coincident. FIG. 12 shows a one pixel wide by one pixel stamp 1200 using the non-transposed probes (that is, up is back, down is forward, and left or right is over). Both movement algorithms described below work with coincident probes. If the stamp is implemented as a constant 1×1 pixel, the algorithms below can be slightly simplified by merging these coincident probe points. Alternatively, the stamp may be implemented with variable size stamps (for example, 4×1 pixels when texture mapping, 4×2 pixels when not) without special logic to handle coincident probe probes.

Some Advantages of Asymmetrical Placement of Sample and Probe Points

Figure 11:
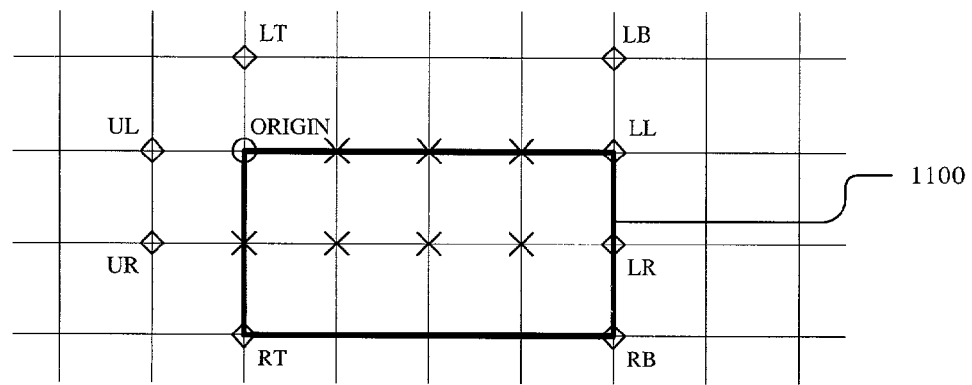
FIG. 11 is a diagram of the fragment stamp in FIG. 10, but with transposed probes.

The fragment stamps shown in FIGS. 10, 11, and 12 have a smallest sampling unit SU of 1, and place the sample points and the probe points at what is apparently the "upper left corner" of pixels. This placement matches semantics of the X11 Window System, in which integer pixel coordinates are considered to be the "center" of a pixel. That is, X11 defines the pixel at integer coordinates (x, y) to "own" the half-open square with upper left corner (x−½, y−½) and lower right corner (x+½, y+½). However, this placement does not match the semantics of OpenGL, in which half-pixel coordinates are considered to be the "center" of the pixel, and so the pixel at integer coordinates (x, y) "owns" the half-open square with upper left corner (x, y) and lower right corner (x+1, y+1). OpenGL semantics are easily accommodated with this arrangement of sample points by adding ½ to each object vertex.

Figure 25:
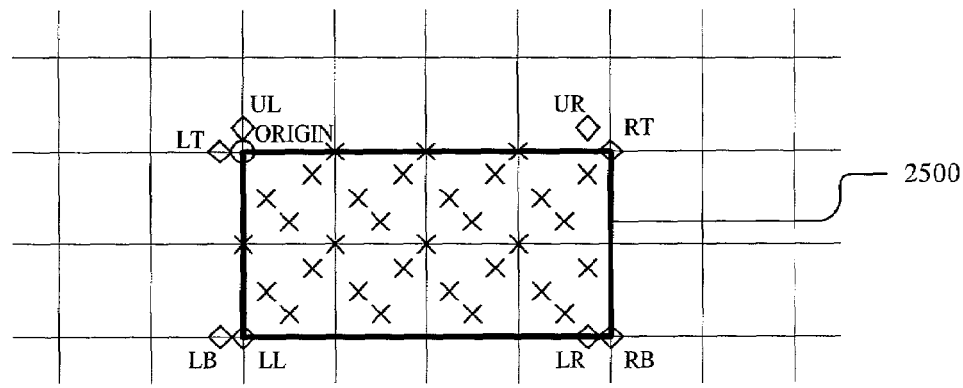
FIG. 25 depicts a fragment stamp with four sample points per pixel for antialiasing.

Similarly, if SU is smaller than 1, the multiple sample points per pixel will not be placed symmetrically around the "center" of each pixel, but will be placed asymmetrically, biased toward the upper left corner of each pixel. For example, if SU is ¼, then four samples points might be placed in each pixel as shown in FIG. 25. In general, OpenGL semantics are accommodated with such placements by adding SU/2 to each object vertex.

Mathematically, the placement of sample points (and thus probes) within pixels is arbitrary. One skilled in the art can easily adapt the invention to a configuration of sample points that are placed symmetrically around the "center" of the pixel, for example by adding SU/2 to the x and y coordinate of each sample point and probe point.

However, asymmetrical placement offers implementation and efficiency advantages. In terms of the implementation of sample points and probe points, fewer inputs to the adders computing the edge functions at each point are required, and these adders need not negate any of their inputs. Further, as discussed below in conjunction with FIG. 17A, steps 1702, 1703 and 1705, this asymmetry can be exploited to reduce the number of cycles required to completely traverse and object.

Method using Bidirectional Movement in Stamplines

As mentioned above, an embodiment of the present invention uses bi-directional stamp movement and has three stamp contexts: the current context, and the saved contexts backSave and overSave.

In one implementation, the saved context backSave has associated with it two bits, backSaveValid, and backSaveSliver. The bit backSaveValid is true when a valid stamp position is stored in the context, otherwise the context is empty. The bit backSaveSliver is true when backSaveValid is true and the position saved is an unproductive "sliver" position that may not need to be visited or saved, as discussed more fully below in the descriptions of steps 1708 through 1710. If backSaveSliver is false, it is unknown if the position is productive or non-productive.

The saved context overSave has associated with it two bits, overSaveValid and overSaveProductive. The bit overSaveValid is true when a valid stamp position is stored in the context, otherwise the context is empty. The bit overSave-Productive is true when overSaveValid is true and the position saved is known to be a productive position that must be visited, as discussed more fully below in the descriptions of steps 1708 through 1710. If overSaveProductive is false, it is unknown if the position is productive or non-productive.

The saved contexts represent the following positions:
1. backSave: the position above the first stamp position in the column stampline.
2. overSave: the first best position found to the right (if started at left-most vertex), or left (if started at right-most vertex) of the current stampline. "First best" means that a position known to be productive can replace a saved position that is not known to be productive.

Step 1701: Determine the Minimal Bounding Box for Object

Figure 18:
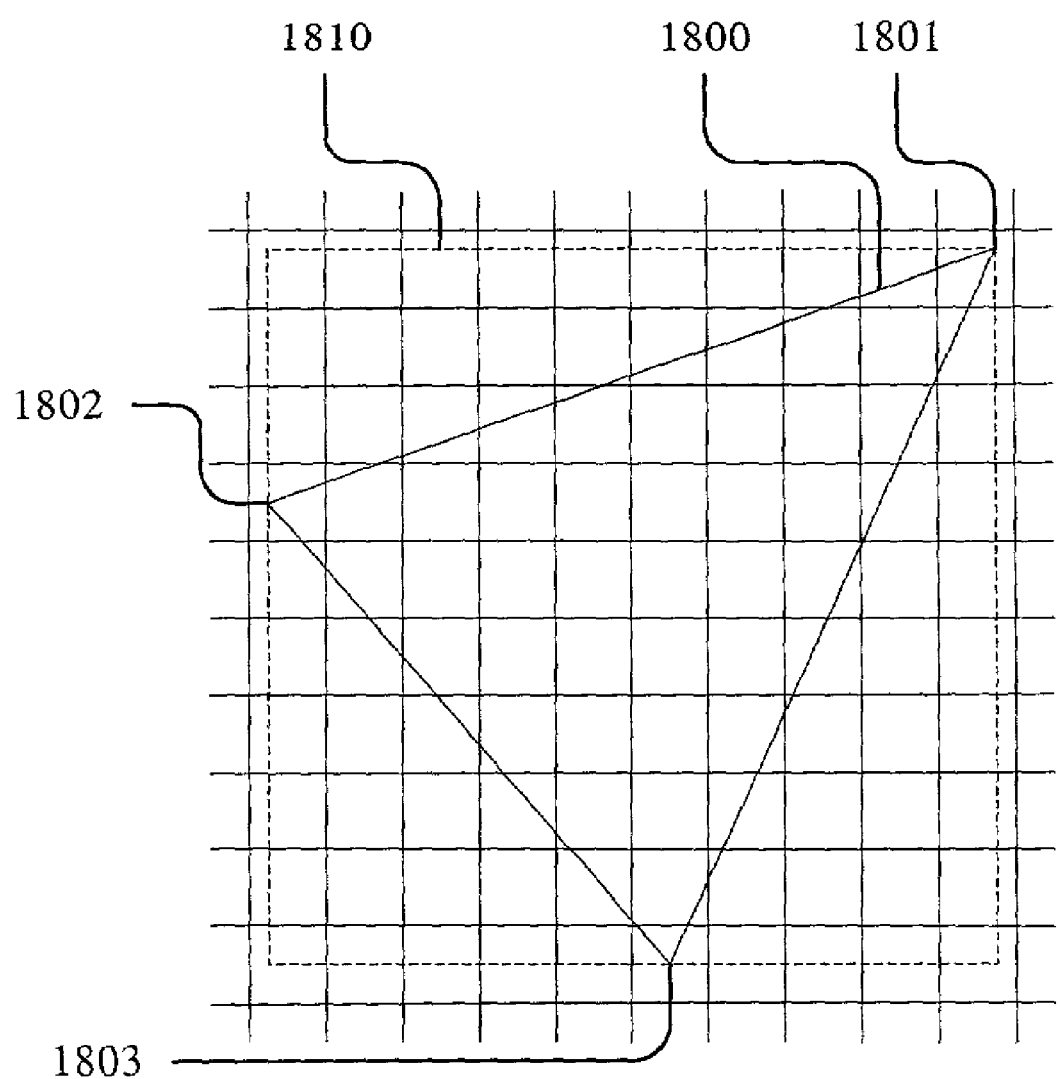
FIG. 18 is a diagram of a minimal bounding box for a triangle.

FIG. 17A, step 1701 determines the minimal rectangular bounding box (bbox) that encloses the object and whose sides are parallel to the x and y axis. For example, FIG. 18 shows a triangle 1800 drawn with solid lines, and its minimal bounding box 1810 drawn with dashed lines. In this embodiment, we allow both three-sided objects like triangles, and four-sided objects like quadrilaterals and rectangular lines, so we allow up to four vertices $(x_0, y_0)$, $(x_1, y_1)$, $(x_2, y_2)$, and $(x_3, y_3)$. For simplicity of this description, assume that for triangles, the $(x_2, y_2)$ vertex is copied into the $(x_3, y_3)$ vertex. C++ code for FIG. 17A, step 1701 is:

$bbox.xmin=\min(x_0, x_1, x_2, x_3);$ $bbox.xmax=\max(x_0, x_1, x_2, x_3);$ $bbox.ymin=\min(y_0, y_1, y_2, y_3);$ $bbox.ymax=\max(y_0, y_1, y_2, y_3);$ It is noted here that the listing of C++ code in this document does not mean that the graphics accelerator is implemented using a general purpose processor that executes C++ code. Rather, the C++ code appearing herein (including Appendices A to H and elsewhere in this document) specifies the logical operations of certain portions of the circuitry of the graphics accelerator.

Step 1702: Select a Starting Vertex on a Side of the Bounding Box

In FIG. 17A, step 1702 selects a starting vertex $(x_{start}, y_{start})$ that is on an edge segment of the bounding box bbox, where start is in the range [0, 3]. Such a vertex is called a single-extreme vertex, as this vertex is at an extreme x or y position of the bounding box. For triangle 1800, all three vertices 1801, 1802, and 1803 are single-extreme vertices.

In this embodiment, if the desired traversal order specifies column stamplines, the starting vertex must be on the left or right side, that is, $(x_{start}, y_{start})$ must satisfy the condition:

$x_{start}==bbox.xmin||x_{start}==bbox.xmax$

In this embodiment, non-transposed probes are used.

In another embodiment, if a traversal order specifies row stamplines, the starting vertex must be on the top or bottom of the bounding box, that is, $(x_{start}, y_{start})$ must satisfy the condition:

$y_{start}==bbox.ymin||y_{start}==bbox.ymax$

In that embodiment, transposed probes are used.

In FIG. 17A, step 1705, described below, a slightly shrunken bounding box is aligned to the stamp size. If the sample points and probe points are asymmetrically placed (for example, shifted toward the upper left as in the preferred embodiment), the bounding box size will be reduced asymmetrically. On average, the number of cycles required to traverse an object is minimized if the starting vertex is chosen to lie on the bounding box side that is opposite the most reduced side of step 1705. In the preferred embodiment, the top and left sides of the bounding box are most reduced in step 1705, so when possible, the bottom or rightmost vertex is preferentially chosen as the starting vertex. In some cases, the type of object forces the choice of starting vertex, and so this optimization is disabled. For example, when painting a line with a dash pattern, it is easiest to paint from the beginning of the line to the end of the line.

There are implementation advantages, such as combining the backSave and forwardSave contexts, to starting at the corner of the bounding box. That is, $(x_{start}, y_{start})$ satisfies the condition:

$(x_{start}==bbox.xmin||x_{start}==bbox.xmax)\&\&$
$(y_{start}==bbox.ymin||y_{start}==bbox.ymax)$ Such a vertex is called a double-extreme vertex, as it is at both an extreme x position and an extreme y position of the bounding box. For triangle 1800, the vertex 1801 is a double-extreme vertex. It is always possible to find a double-extreme vertex for triangles, thin OpenGL lines, Microsoft Windows lines, thin X11 lines, and wide OpenGL aliased lines. However, it is not possible to find a double-extreme vertex for X11 wide lines, nor for OpenGL antialiased lines. These objects may still be rendered using fewer contexts by splitting them into two portions, each of which has a double-extreme vertex. An algorithm that uses fewer states by starting at a double-extreme vertex, will not be described. But such an algorithm can be easily derived by merging the back and forward sparse contexts, as well as the backSave and forwardSave contexts, and by setting overProductive true at every position. Note that while always choosing a double-extreme vertex reduces implementation complexity, it decreases efficiency by requiring the stamp to start sometimes at the upper leftmost vertex, and by eliminating the effectiveness of the overProductive bit.

Step 1703: Align the Starting Position to the Stamp Size

In general, the starting vertex $(x_{start}, y_{start})$ is specified with subpixel accuracy, e.g., $(19^{15}/_{16}, 34^{2}/_{16})$. The origin of the stamp, though, typically is preferably aligned to an (x, y) position commensurate with the stamp rectangle's dimensions. For example, if the stamp rectangle is four pixels wide by two pixels high, then the starting position is preferably aligned so that the x position is a multiple of four pixels, and the y position is a multiple of two pixels.

Figure 27:
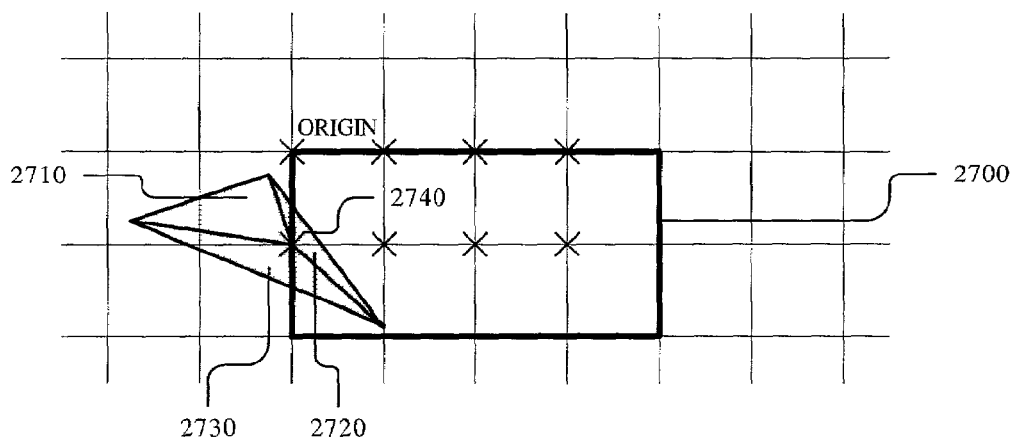
FIG. 27 depicts a sample point that is shared between three triangles.

A special tie-breaking rule must be applied if a directed edge, or a vertex, falls exactly on a sample point (that is, the edge function or both edge functions evaluate to 0 at the sample point). FIG. 27 shows an example in which three triangles 2710, 2720, and 2730 all share a vertex at sample point 2740. The tie-breaking rule ensures that exactly one of these three triangles will include the sample point 2740. Which triangle the tie-breaking rule assigns the sample point to is arbitrary. A typical tie-breaking rule is to include a sample point that does not lie on a right edge of a triangle; if the sample point is on a horizontal edge it is included if the horizontal edge is the top of the triangle and if the sample point is not on a right edge of the triangle. This rule is hereafter referred to as "left top." There are seven other similar rules: "top left," "left bottom," "bottom left," "right bottom" etc. With the "left top" tie-breaking rule, for example, sample point 2740 of FIG. 27 is included in triangle 2740, but is not included in triangles 2710 and 2730 because it is on a right edge of each of these triangles. Without loss of generality, the optimizations described immediately below and in conjunction with Step 1705 apply to the "top left" and "left top" tie-breaking rules for stamps which contain sample points on the left and top edges of the stamp. As should be obvious to one versed in the arts, similar optimizations apply to the other six tie-breaking rules. Similarly, similar optimizations apply to other arrangements of sample points.

With the "top left" and "left top" tie-breaking rules, there is no need to visit stamp positions in which the right-most vertex is exactly on the left edge of the stamp rectangle, or in which the bottom-most vertex is exactly on the top edge of the stamp rectangle. For example, in FIG. 27, there is no need to visit stamp position 2700 when rendering triangle 2710, as the tie-breaking rules guarantee that the rightmost vertex of triangle 2710 cannot include a sample point of the stamp at that position.

If a right-most starting vertex lies on a stamp rectangle edge, and/or a bottom-most starting vertex lies on a stamp rectangle edge, the starting coordinates can be adjusted by the subpixel precision epsilon so that the stamp will start in the position to the left and/or above the starting vertex. The subpixel precision epsilon is the granularity with which the graphics accelerator internally represents vertex coordinates used to generate fragments, and is usually equal to or finer than the antialiasing sample grid spacing SU, described above. The subpixel precision epsilon may be much coarser than the granularity with which the application may specify vertex coordinates, especially if the graphics accelerator accepts such coordinates in a floating point representation.

This alignment of the starting position to the stamp size is performed in FIG. 17A, step 1703:

$x_{adj} = x_{start} - ((x_{start} == b\text{box}.x\text{max})?\text{epsilon}: 0);$ $y_{adj} = y_{start} - ((y_{start} == b\text{box}.y\text{max})?\text{epsilon}: 0);$ $x_{alignedStart} = x_{adj} - (x_{adj} \bmod \text{stampWidth});$ $y_{alignedStart} = y_{adj} - (y_{adj} \bmod \text{stampHeight});$ In the preferred embodiments, stampWidth and stampHeight are both powers of two, and so the alignment can be performed more efficiently as a masking operation:

$x_{alignedStart} = x_{adj} \& \sim(\text{stampWidth}-1);$ $y_{alignedStart} = y_{ajd} \& \sim(\text{stampHeight}-1);$ If the $x_{adj}$ and $y_{adj}$ coordinates above are fixed-point values with one or more bits of subpixel precision, they must first be shifted right by the number of subpixel bits before being masked.

Note that if epsilon is sufficiently small (e.g., smaller than $\frac{1}{16}$), the starting vertex will rarely trigger this condition, and this adjustment may not be worth the implementation cost.

There is no simple way to similarly adjust the starting position for a left-most or top-most starting vertex that is to the right of the right-most sample point, or below the bottom-most sample point of the stamp. Instead, the invention avoids such situation by preferentially choosing a right-most or bottom-most starting vertex in FIG. 17A, step 1702, described above.

Step 1704: Initialize the Edge Evaluators

In FIG. 17A, step 1704, the edge evaluators are initialized for the aligned starting position. This involves computing the increments A and B for each edge function E(x, y)=Ax+By+C, and computing the value each edge function at the position ($x_{alignedStart}$, $y_{alignedStart}$). The setup for the edge evaluators is described by Pineda in the above mentioned article.

Step 1705: Determine a Bounding Box Aligned to the Stamp Size

FIG. 17A, step 1705 creates extent, a version of the minimal bounding box aligned to the stamp size. This simplifies the implementation of the second intersection test, which ensures that a valid stamp position is not outside the bounding box of the object. The minimal bounding box is slightly reduced in size before aligning its edges, so as to avoid visiting stamp positions in which the object protrudes so slightly that it cannot include any sample points, but whose shadow spans a relevant segment between probes.

Figure 28:
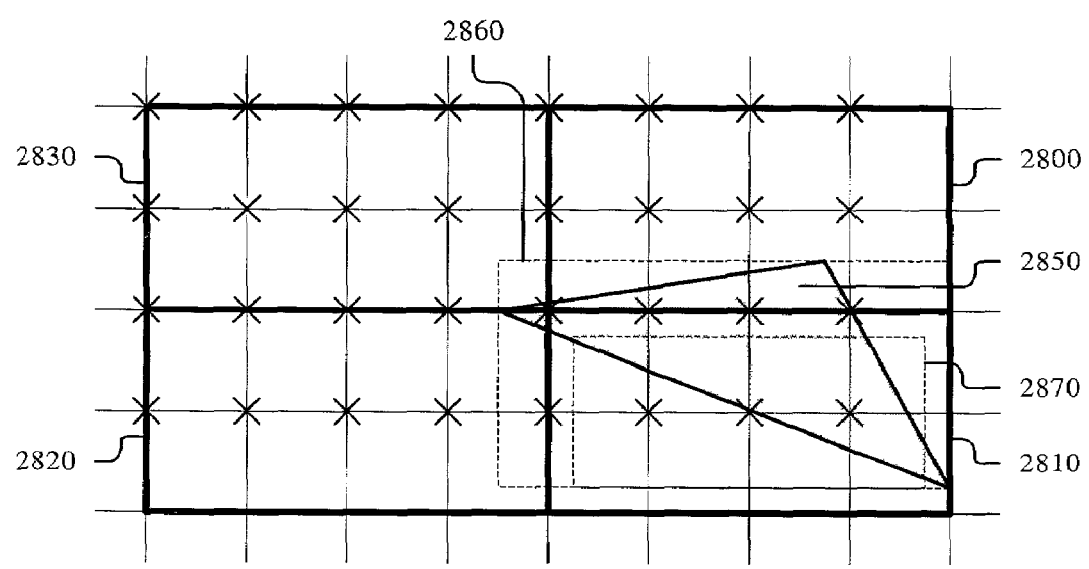
FIG. 28 depicts a bounding box and a reduced bounding box for an exemplary triangle.

As mentioned above in the description of FIG. 17A, step 1703, there is no need to visit stamp positions in which the right-most vertex is exactly on the left edge of the stamp rectangle, or in which the bottom-most vertex is exactly on the top edge of the stamp rectangle. Step 1705 adjusts the maximum x and y values of the bounding box before alignment so that any such stamp position will be considered outside the object Similarly, there is no need to visit stamp positions in which the left-most vertex is to the right of the right-most sample point in the stamp (stampWidth-SU in the preferred embodiment), or in which the top-most vertex is below the bottom-most sample point in the stamp (stampHeight-SU). Step 1705 adjusts the minimum x and y values of the bounding box before alignment so that any such stamp position will be considered outside the object. The following C++ code shows how the reduced bounding box is computed:

reduced.xmin=bbox.xmin+SU−epsilon;

reduced.xmax=bbox.xmax−epsilon;

reduced.ymin=bbox.ymin+SU−epsilon;

reduced.ymax=bbox.ymax−epsilon;

FIG. 28 shows how the bounding box 2860 and the reduced bounding box 2870 are computed for a triangle 2850. In this example, the sampling unit SU is 1 pixel, while the subpixel precision epsilon is ¼ pixel. The bounding box 2860 is the smallest rectangle than contains the triangle 2850. Since the right-most vertex of triangle 2850 falls on the right edge of the stamp rectangle at position 2810, the right edge of the bounding box 2860 is moved to the left by ¼ pixel (epsilon) to create the right edge of the reduced bounding box 2870. The bottom-most vertex of triangle 2850 does not fall on the edge of a stamp rectangle, and so the bottom edge of reduced bounding box 2870 is at the same vertical position as the bottom edge of bounding box 2860. The top and left edges of bounding box 2860 are moved down and right, respectively, by ¾ pixels (SU−epsilon) to create the top and left edges of reduced bounding box 2870. Note that since triangle 2850 does not project far enough up to contain any sample points at stamp position 2800, and does not project far enough left to contain any sample points at stamp positions 2820 or 2830, this adjustment shrinks the reduced bounding box 2870 so that these positions will not be visited.

The stamp-aligned bounding box extent can be computed from reduced as follows:

extent.xmin=reduced.xmin−(reduced.xmin mod stampWidth);

extent.xmax=reduced.xmax−(reduced.xmax mod stampWidth);

extent.ymin=reduced.ymin−(reduced.ymin mod stampHeight);

extent.ymax=reduced.ymax−(reduced.ymax mod stampHeight);

Again, since stampWidth and stampHeight are powers of two in the preferred implementation, the alignment may be implemented using masking operations rather than modulo operations, similar to those in FIG. 17A, step 1703.

In an actual implementation, the additions and subtractions of stampWidth and stampHeight mentioned in the description of step 1707 below are folded into the computation of the reduced bounding box.

Step 1706: Initialize the Starting Bookkeeping State of the Invention

FIG. 17A, step 1706 initializes the values of all states used while traversing the object. The following are initial bookkeeping state values used herein, and the C++ code to initialize them:

```
if (!transposedProbes &&x_start == bbox.xmin
   || transposedProbes && y_start == bbox.ymin)
    dirOver = POSITIVE
else
    dirOver = NEGATIVE;
firstColumnInObject = true;     // Haven't made an over move yet?
firstPositionInLine = true;     // First stamp position in this stampline
dirForwardBack == POSITIVE      // Moving forward or back in this
                                //   stampline?
```

Initially, all saved contexts are invalid:
overSaveValid=false;
overSaveProductive=false;
backSaveValid=false;
backSaveSliver=false;

Note, steps 1707 through 1711, described in the following sections, are repeated until no further stamp moves are possible in step 1709. Thereafter, the process is repeated for another object.

Step 1707: Evaluate Edge Functions at Each Probe and Compute Valid, Sliver, and Productive Bits For stamp movement purposes there are three additional "sparse" stamp contexts. The sparse stamp contexts contain much less information than the full contexts described above. These sparse stamp contexts do not include all the information associated with the interpolated values of colors, Z depth, transparency, and so on, and instead only include the edge function values for these stamp positions. Furthermore, the edge function values for these positions are not stored in flip-flop or latch circuits of the graphic accelerator 108, but are determined anew each cycle by combinational logic. These sparse contexts are (with non-transposed probes):

1. forward: the stamp position immediately below the current position
2. back: the stamp position immediately above the current position
3. over: the stamp position immediately right of the current position if dirOver is POSITIVE, else the position immediately to the left.

At each stamp position, these three adjacent positions are examined to determine if they are valid (that is, should possibly be moved to). In addition, the forward and back positions are examined to determine if they are slivers. Sliver positions are unproductive, and generate no fragments, but may need to be visited in order to get to more distant productive positions. And, the over position is examined to determine if it is known to be productive.

Note that for the most part, valid, sliver, and productive bits are hints-valid may be falsely positive, and sliver and productive bits may be falsely negative. That is, a valid forward or back position that is not marked as a sliver may not even contain a portion of the graphics object, or may satisfy sliver semantics. A valid over position that is not determined to be productive may or may not actually be productive. In general, any feasible implementation has to settle for detecting a reasonable subset of the positions as valid, sliver, and productive.

Since several intersection tests may be used to set the valid, sliver, and productive indicators for the sparse stamp contexts, in an actual implementation it is convenient for the procedure Intersects to perform only the first portion of the intersection test. That is, the Intersects procedure returns true if the specified segment between probe points either intersects the object, or spans its shadow.

The second portion of the intersection test, that is, the test for the stamp position being inside the aligned bounding box extent, is performed separately for each of the nearby positions. The valid, sliver, and productive bits are then logically ANDed with the appropriate results of the bounding box test at convenient points in their computation. To compute the bounding box test, four values are first computed:

rightInsideObject=current.x+ stampWidth<=extent.xmax;

leftInsideObject=current.x− stampWidth>=extent.xmin;

downInsideObject=current.y+ stampHeight<=extent.ymax;

upInsideObject=current.y−stampHeight>=extent.ymin;

(In an actual implementation, the addition and subtraction of stampWidth and stampHeight are folded into the computations of the reduced bounding box described above in step 1705.) These four values are then mapped into the forward, back, and over contexts, depending on if probes are transposed or not:

```
if (!transposedProbes) {
    forwardInsideObject = downInsideObject;
    backInsideObject = upInsideObject;
    overInsideObject =
        (dirOver == POSITIVE ? rightInsideObject : leftInsideObject);
```

-continued

```
} else {
   forwardInsideObject = rightInsideObject;
   backInsideObject = leftInsideObject;
   overInsideObject =
      (dirOver == POSITIVE ? downInsideObject : upInsideObject);
}
```

Determining backValid and backSliver

To test if the stamp can move up (e.g., to a position above the current position), the invention does not test if the object intersects the segment (ORIGIN, RT) as does prior art. The present invention instead tests for intersection with the smaller and higher segment (UL, UR), as well as one or both of the small diagonal segments (LT, UL) and (UR, RT).

If the object intersects (UL, UR), backValid is set true, and backSliver is set false. In this case, the object extends far enough upward to potentially include sample points along the segment (UL, UR). Even if the object does not contain UL or UR, or any other sample point along that segment (that is, the object slips between two adjacent sample points), it may nonetheless contain sample points higher up.

Figure 13:
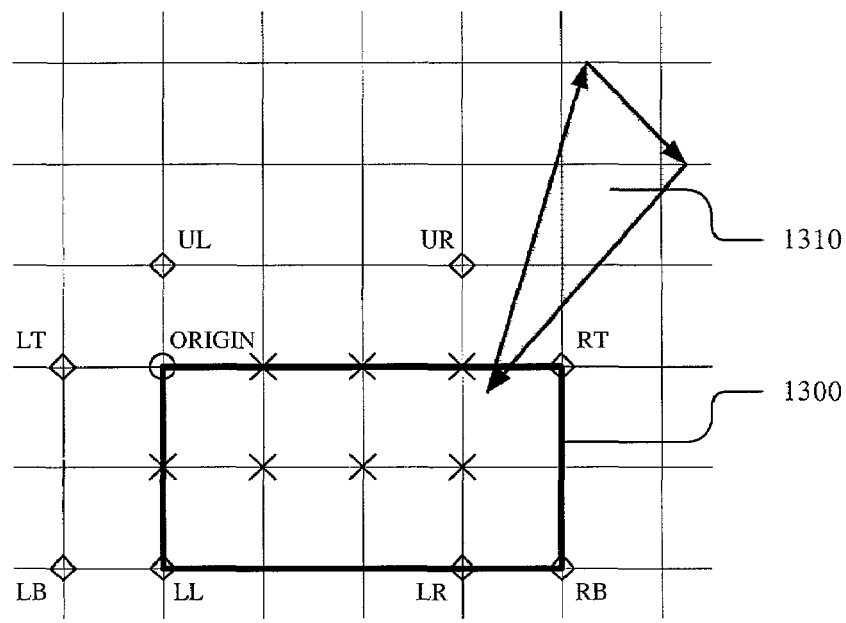
FIG. 13 is a diagram of a triangle with a sliver position above the stamp.
Figure 14:
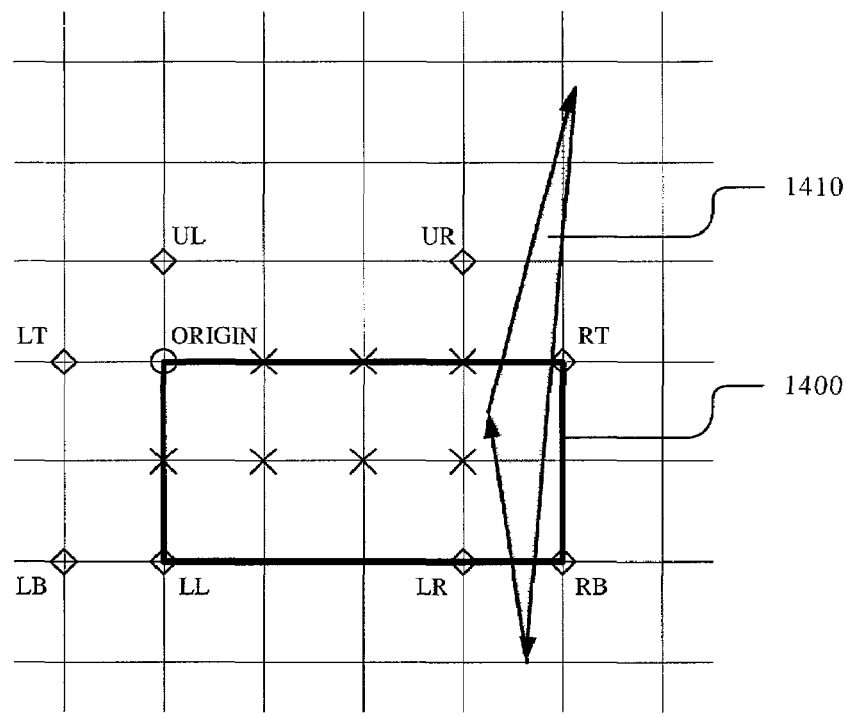
FIG. 14 is a diagram of a triangle with sliver positions above and below the stamp.

If the stamp is moving over from left to right, and the object does not intersect (UL, UR), but does intersect (UR, RT), the back position is marked as a sliver. That is, backValid and backSliver are both set true. In this case, there are no productive positions in this stamp column above the current position, but visiting the position above may still be necessary. If no positions more promising that moving back are found, then the sliver position above should be visited, as it may lead to productive positions in the next stamp column to the right. FIGS. 13 and 14 show situations in which the position above is a sliver and therefore non-productive, but must be visited in order to get to the productive position diagonally up and to the right. In FIG. 13, the triangle 1310 satisfies this sliver condition for stamp 1300. There are no other valid positions, so the sliver will be visited immediately so that the stamp can reach the position diagonally up and right, which does contain a couple of fragments of triangle 1310. In FIG. 14, the triangle 1410 satisfies this sliver condition for stamp 1400, but also satisfies one of the forward sliver conditions discussed below. The stamp will save the position above in the backSave stamp context, then visit the forward position below. Since that path does not lead to any valid over positions, whether productive or not, the saved sliver context will be restored, and the stamp will visit the unproductive back position above in order to visit the productive position diagonally up and right.

Similarly, if the stamp is moving over from right to left, and the object does not intersect (UL, UR), but does intersect (LT, UL), the back position is again marked as a valid, but sliver, position.

Figure 15:
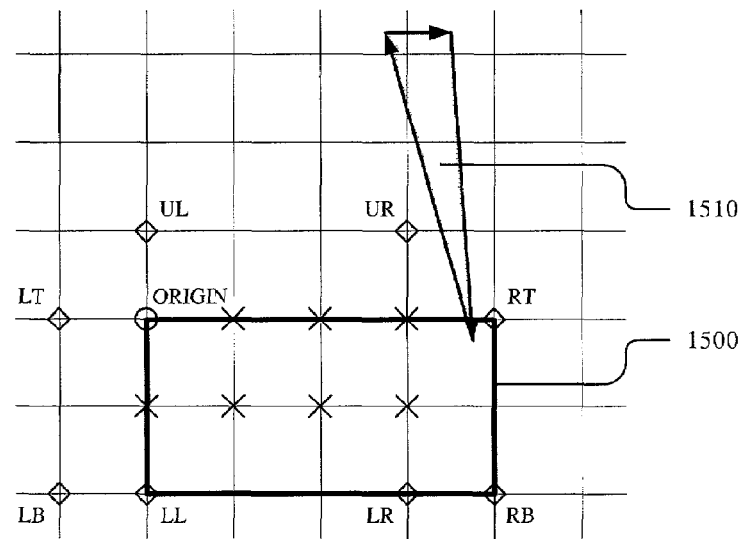
FIG. 15 is a diagram of a triangle with a special first-column sliver position above the stamp.

Finally, if the stamp is moving over from right to left, and the object does not intersect (UL, UR), but does intersect (UR, RT), and the stamp is in the first (right-most) column of the object (that is, it's x coordinate is the same as the starting stamp position's x coordinate), the back position is marked as a sliver. In this special case, there may be productive positions within this column stampline. In FIG. 15, the triangle 1510 satisfies this special sliver condition for stamp 1500. The stamp 1500 will move up, again trigger this special sliver condition, and finally move up again before reaching a productive position in which a sample point is inside the triangle.

Figure 16:
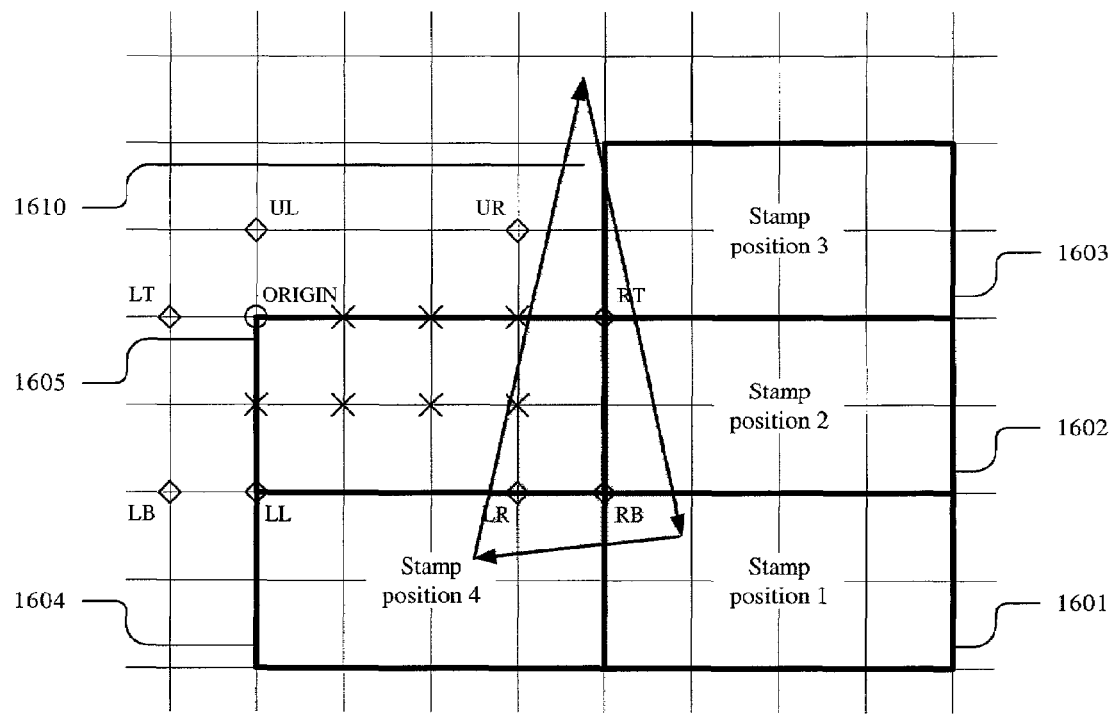
FIG. 16 is a diagram of a triangle that demonstrates why the special first-column sliver test should not occur in the last column stampline of an object.

The reasons that this special sliver case is enabled only for the first column of the object are subtle. In the stamp columns between the first (right-most) and last (left-most) stamp columns (if any), it does not matter if the special case is enabled: both algorithms described below traverse the object in a fashion that avoids moving back due to a (UR, RT) intersection. In these middle columns, the stamp visits positions "outside" to the right of the object, which allows it to use the LT and LB probes to move over at the most appropriate time. However, this special sliver case must be disabled in the last (left-most) column of any object that contains two or more column stamplines, so that the stamp does not visit positions in the last column that are guaranteed to be unproductive. FIG. 16 shows an example in which the stamp 1605 started at the lower right vertex, and has already visited stamp positions 1 through 4 (1601–1604). Though the current stamp position 1605 has a (UR, RT) intersection, there is no point in going up, as all positions above in triangle 1610 are unproductive. The special sliver enabling is controlled by the state bit firstColumnInObject, which is initialized true, but set false by the movement algorithm immediately upon visiting an over position.

If none of the above conditions are met, the stamp never need move up from the current position, and both backValid and backSilver are set false.

Determining forwardValid and forwardSliver

Although the probe points along the bottom of the stamp are not placed symmetrically with the probes at the top of the stamp, the conditions for moving down are symmetrical with the conditions for moving up. Rather than testing if the object intersects the segment (LL, RB) as does prior art, the present embodiment instead tests for intersection with the smaller segment (LL, LR), as well as one or both of the small horizontal segments (LR, RB) and (LB, LL).

If the object intersects (LL, LR), the position below may be productive: forwardValid is set true, and forwardSliver is set false.

If the stamp is moving over from left to right, and the object does not intersect (LL, LR), but does intersect (LR, RB), the forward position is marked as a sliver: forwardValid and forwardSliver are set true.

Similarly, if the stamp is moving over from right to left, and the object does not intersect (LL, LR), but does intersect (LB, LL), the forward position is again marked as a sliver.

Finally, if the stamp is moving over from right to left, and the object does not intersect (LL, LR), but does intersect (LR, RB), and the stamp is in the first (right-most) column of the object (that is, it's x coordinate is the same as the starting stamp position's x coordinate), the forward position is marked as a sliver.

If none of the above conditions is met, the stamp never needs to move down from the current position, and both forwardValid and forwardSilver are set false.

Determining overValid and overProductive

If the stamp is moving over from left to right, overValid is set true if the object intersects (RT, RB). Efficiency can be further improved by determining if the over position is guaranteed to be productive. The invention may examine several different over positions in the next stampline while moving in the forward or back directions in the current stampline. By moving to an over position that is know to be productive when all forward and back moves have been made, the invention sometimes avoids moving to an unproductive top-most stamp position in the next column stampline. By moving to a lower position in the next stampline, the stamp may avoid such unproductive positions if they are invalid back moves from the position immediately below.

In this embodiment, it is assumed that the origin of the stamp is also a sample point. Further the present embodiment sets overProductive true if the stamp is moving over from left to right, overValid is true, and the probe RT is inside the object. A different, similar test could be used if the origin is not a sample point, such as in some antialiased sample point arrangements.

The tests for moving over from right to left are symmetrical: overValid is set true if the object intersects (LT, LB), and overProductive is set true if overValid is true and the probe LT is inside the object.

Exemplary C++ code for determining the sparse context valid, sliver, and productive bits is shown in Appendix A.

Step 1708: Quash Forward and Back Slivers

If the sparse context over, or the saved context overSave, is valid, then there is no point in moving to any sliver back and forward positions, whether sparse or saved contexts, even if the over context is not known to be productive. The back and forward slivers never lead to any productive stamp positions in the current stampline, but merely lead to a valid stamp position in the next stampline over. Thus, a valid over position immediately quashes any sliver back and forward positions by setting their valid and sliver bits to false. Sliver quashing substantially simplifies the implementation of the desired movement priorities in steps 1709 and 1710.

Exemplary C++ code for step 1708 is in Appendix B.

Step 1709: Determine Next Stamp Position and Move Stamp

Appendix C gives the C++ code for moving a stamp as performed by FIG. 17A, step 1709. As shown in Appendix C, stamp movement depends, at least in part, on the various previously determined valid bits (e.g., forwardValid, backSaveValid, etc.). In some instances, the next position of the fragment stamp is restored from one of the various saved context values (e.g., backSave, overSave, etc.).

In particular, the C++ code of Appendix C, in conjunction with the sliver quashing of step 1708 shown in Appendix B, implements a stamp movement algorithm where the fragment stamp moves to an unvisited non-sliver valid forward stamp position or an unvisited non-sliver valid back stamp position, if any such stamp position exists. If not, the fragment stamp attempts to move to an unvisited valid over stamp position, if any such stamp position exists. If the unvisited valid over stamp position is unavailable, then the fragment stamp attempts to move to an unvisited sliver forward stamp position or an unvisited sliver back stamp position, if any such stamp position exists. The sliver quashing of step 1708 simplifies the C++ code of Appendix C, by eliminating the need to test for forward and back non-sliver positions separately from forward and back sliver positions.

Step 1710: Update Saved Contexts

After deciding which way to move, FIG. 17A, step 1710 decides which sparse contexts, if any, should be stored into the corresponding saved contexts, and which saved contexts should be invalidated. Although any given sparse context can be stored into exactly one of the saved contexts in this step, multiple different sparse contexts can be stored into multiple different saved contexts. The sparse back context may be stored into backSave, and/or over may be stored into overSave. In order to maintain the "first best" over position in overSave, an over position that is known to be productive replaces a previously saved over position that is not known to be productive.

Appendix D gives the C++ code for updating saved contexts as performed by step 1710.

Step 1711: Update Other Bookkeeping Information

Finally, FIG. 17A, step 1711 updates the values that indicate in which direction the stamp is moving and other information, for example, if this is the first position within a stampline. The C++ code for this updating is given in Appendix E.

After completing step 1711, the process resumes at step 1707 to process the object at the current stamp position, until the movement logic of step 1709 determines that the object has been completely traversed.

Alternate Embodiment—Unidirectional Movement in Stamplines

Figure 17B:
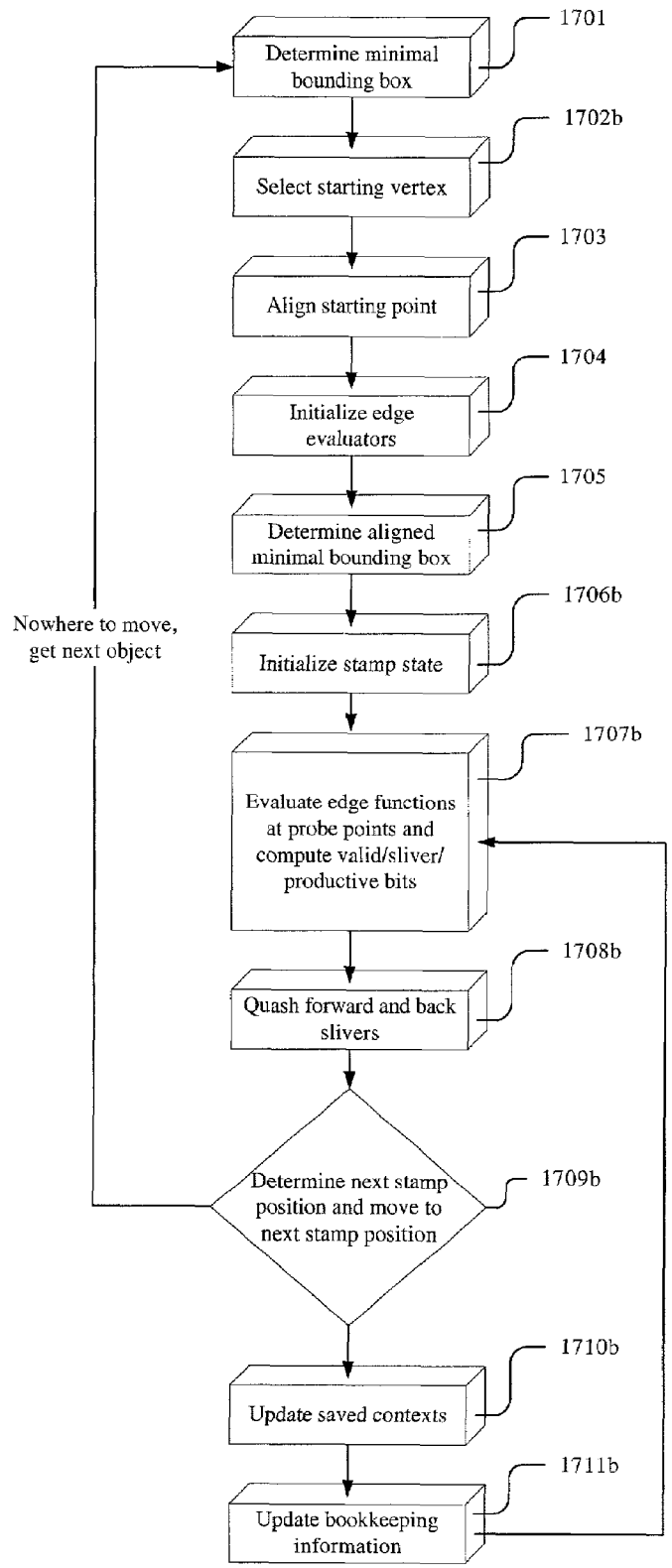
FIG. 17B is a flow diagram for a fragment stamp traversal method according to another embodiment of the invention.

An alternative embodiment, shown in FIG. 17B, involves a different way of visiting positions within the object, as sketched in the section "Example of Order of Traversal Using Unidirectional Movement in Stamplines" above. In the following sections, the meaning of the terms forward, back, and over are the same as above in the sense that forward will mean down, back will mean up, and over will mean left or right. However, this alternative embodiment gives over moves priority over forward or back moves, and so traverses row stamplines.

This alternative implementation can also paint column stamplines by transposing the position of the probes around the stamp, and by appropriately changing the derivation of the fowardInsideObject, backInsideObject, and overInsideObject bits as previously described.

This alternative implementation has no overSave stamp context, but instead has a forwardSave context. It saves the first valid position it finds below the stampline in forwardSave, and the first valid position it finds above the stampline in backSave. When it gets to the right (or left, if going right-to-left) edge of the object, it then restores the forwardSave position, and proceeds along that stampline, again saving the first valid position it finds below the stampline in forwardSave. When it reaches the bottom if the object, it restores the backSave position, proceeds along that stampline, saving the first valid position it finds above the stampline in backSave. When it reaches the top of the object and cannot restore a backSave position, it is done generating all fragments within the object.

The saved contexts represent the following positions:
1. backSave: the first best position not yet visited found above the current (row) stampline. ("First best" means that the first non-sliver back position is saved, and a sliver back position is saved only if there is no valid over position to which to move.)
2. forwardSave: the first best position not yet visited found below the current stampline.

In this alternative implementation, in FIG. 17B, steps 1701, and steps 1703 through 1705 are the same as those of FIG. 17A Steps 1702b, and 1706b through 1711b, described below, are analogous to steps 1702, and 1706 through 1711 of FIG. 17A, but with the changes needed to implement the alternate traversal order.

Step 1702b: Select a Starting Vertex on a Side of the Bounding Box

Step 1702b is similar to Step 1702, except that the conditions for row and column stamplines are swapped. That is, if row stamplines are desired the starting vertex must be on the left or right edge of the minimal bounding box and the non-transposed probes are used; if column stamplines are desired the starting vertex must be on the top or bottom edge of the minimal bounding box and the transposed probes are used.

Step 1706b: Initialize the Starting Bookkeeping State of the Invention

Step 1706b is similar to Step 1706, except forwardSave takes the place of overSave, and firstStamplineInObject takes the place of firstPositionInLine:

```
if ( !transposedProbes && x_start == bbox.xmin
   || transposedProbes && y_start == bbox.ymin)
    dirOver = POSITIVE
else
    dirOver = NEGATIVE;
dirTopToBottom = (!transposedProbes &&y_start == bbox.ymin
                  || transposedProbes && x_start == bbox.xmin) ;
dirForwardBack = POSITIVE;    // Stamp movement from row to row in
                              // the forward or back direction?
firstColumnInObject = true;   // Haven't made an over move yet?
firstStamplineInObject = true; // First stampline, where we save both
                              // forward and back positions?
backSaveValid = false;
backSaveSliver = false;
forwardSaveValid = false;
forwardSaveSliver = false;
```

Step 1707b: Evaluate Edge Functions at Each Probe and Compute Valid and Sliver Bits Step 1707b is nearly identical to step 1707 described above. However, an over position must be taken unless it is a sliver, and thus known to be unproductive and uncapable of leading to a productive position in the stampline. Such a sliver is only followed as a last resort. Thus, this alternative implementation does not use the overProductive bit, and so it need not be computed in step 1707b. Instead, it computes overSliver, as shown in the following C++ code:

```
if (dirOver == NEGATIVE) {
    overValid = overInsideObject && leftIntersect;
    overSliver = !Intersects (LEFT_TOP, LEFT_MIDDLE);
} else {
    overValid = overInsideObject && rightIntersect;
    overSliver = !Intersects (RIGHT_TOP, RIGHT_MIDDLE);
}
overSliver &= overValid && dirTopToBottom;
```

Note that steps 1707b through 1711b are repeated until no further moves are possible in Step 1709b.

Step 1708b: Quash Forward and Back Slivers

Step 1708b is nearly identical to Step 1708, except that forwardSave slivers must be quashed also if over is valid. The following C++ code shows the operation of step 1708b:

```
if (overValid) {
    // Invalidate all forward and back slivers, in both sparse and
        saved contexts
    if (forwardSliver) {
        forwardValid = forwardSliver = false;
    }
    if (forwardSaveSliver) {
        forwardSaveValid = forwardSaveSliver = false;
    }
    if (backSliver) {
        backValid = backSliver = false;
    }
    if (backSaveSliver) {
        backSaveValid = backSaveSliver = false;
    }
}
```

Step 1709b: Determine Next Stamp Position

Here is where the alternate method differs substantially from the bidirectional movement algorithm. Note that giving over moves priority means that the invention cannot avoid moving to an over position that is not known to be productive. Further, over moves should not invalidate back or forward slivers that are not adjacent to the current stampline, as described in more detail below in step 1710b.

Appendix F contains C++ code that implements the unidirectional movement algorithm.

In particular, the C++ code of Appendix F implements an algorithm where the fragment stamp moves an unvisited valid non-sliver over stamp position, if any such stamp position exists.

Otherwise, the fragment stamp moves to an unvisited valid non-sliver forward or back stamp position, if the appropriate such stamp position exists, either adjacent to the current position or previously saved by step 1710b. A forward position is chosen only if the algorithm is moving from stampline to stampline in the forward direction; a back position is chosen only if the algorithm is moving from stampline to stampline in the back direction. The stampline to stampline movement is controlled in part by the dirForwardBack bookkeeping state bit.

Otherwise, the fragment stamp moves to an unvisited sliver over stamp position, if any such stamp position exists.

Otherwise, the fragment stamp moves to an unvisited sliver forward or back stamp position, if the appropriate such stamp position exists. Again, a forward position is chosen only if the algorithm is moving from stampline to stampline in the forward direction; a back position is chosen only if the algorithm is moving from stampline to stampline in the back direction.

Again, the sliver quashing of step 1708b substantially simplifies the C++ code in Appendix F, by removing the need to test non-sliver and sliver cases separately. Note also that the code in Appendix F anticipates when dirForwardBack will change to NEGATIVE, by moving directly to a back or backSave position when dirForwardback is POSITIVE, but no valid forward or forwardSave position exists.

Step 1710b: Update Saved Contexts

In the first stampline of an object, we can save into one or both of backSave and forwardSave. After that, we can save into forwardSave if dirForwardBack=POSITIVE, else we can save into backSave. If any kind of forward move is made, either directly to the sparse forward context, or indirectly by loading the fowardSave context, the backSaveSliver bit is set false. Symmetrically, if any kind of back move is made, the forwardSaveSliver bit is set false. The prevents step 1708b from using an unrelated valid over position to invalidate a saved sliver position that may lead to a productive position. Appendix G contains C++ code to update the saved contexts.

Step 1711b: Update Other Bookkeeping Information

Appendix H shows the C++ code to update the other bookkeeping information. Again, this is similar to Step 1711, except there is no goOverSave way of moving over, and firstStamplineInObject is updated differently from firstPositionInLine.

Graphics Accelerator Logic

Figure 19:
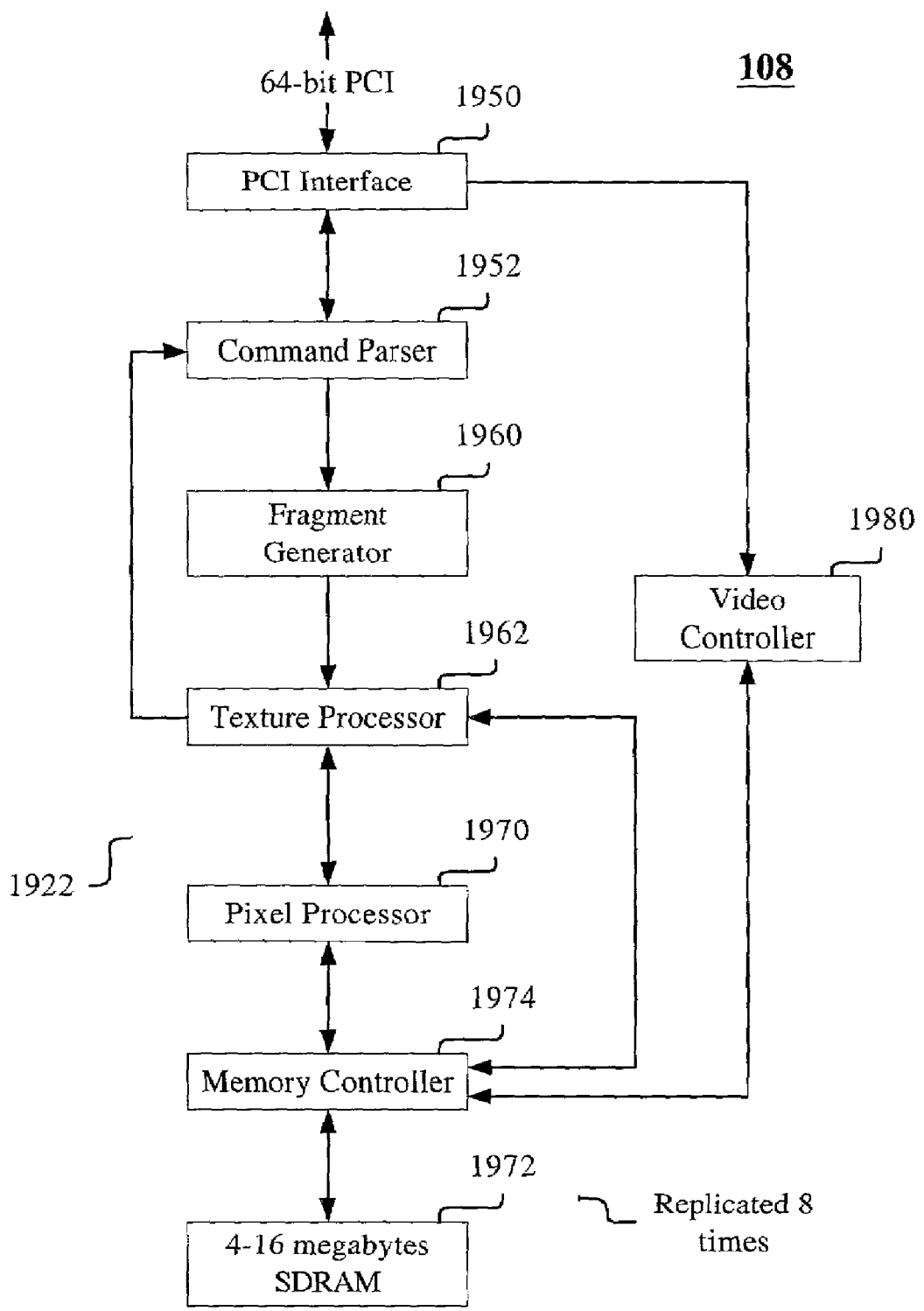
FIG. 19 is a diagram of a graphics engine.

FIG. 19 depicts a simplified representation of the graphics accelerator 108 (FIG. 1). An interface 1950, such as a PCI interface, couples the graphics accelerator to the system chipset 104 (FIG. 1). Graphics rendering and other commands received from the processing unit 102 (FIG. 1) via the system chipset are parsed by a command parser 1952. The parser 1952 determines the object rendering operations to be performed, and passes these to a fragment generator 1960, which will be described in more detail with reference to FIGS. 20 and 21. Fragments generated by the fragment generator 1960 are further processed by a texture processor 1962 so as to apply a specified texture pattern, if any, to the object being rendered. The resulting fragments are then passed to one or more pixel pipelines 1922 for pixel processing and storage. A pixel pipeline 1922 preferably includes a pixel processor 1970 for storing fragments into the frame buffer 1972 via a memory controller 1974. The pixel processor 1970 may perform tasks such as combining a fragment previously stored in the frame buffer 1972 with a fragment obtained from the graphics accelerator 108 and then storing the resulting combined fragment back into the frame buffer 1972.

A video controller 1980 couples the frame buffer 1972 to a display device 126 (FIG. 1). The video controller 1980 reads pixel values from the frame buffer 1972 via memory controller 1974 and sends corresponding pixel information to the display device 126 for display.

Figure 20:
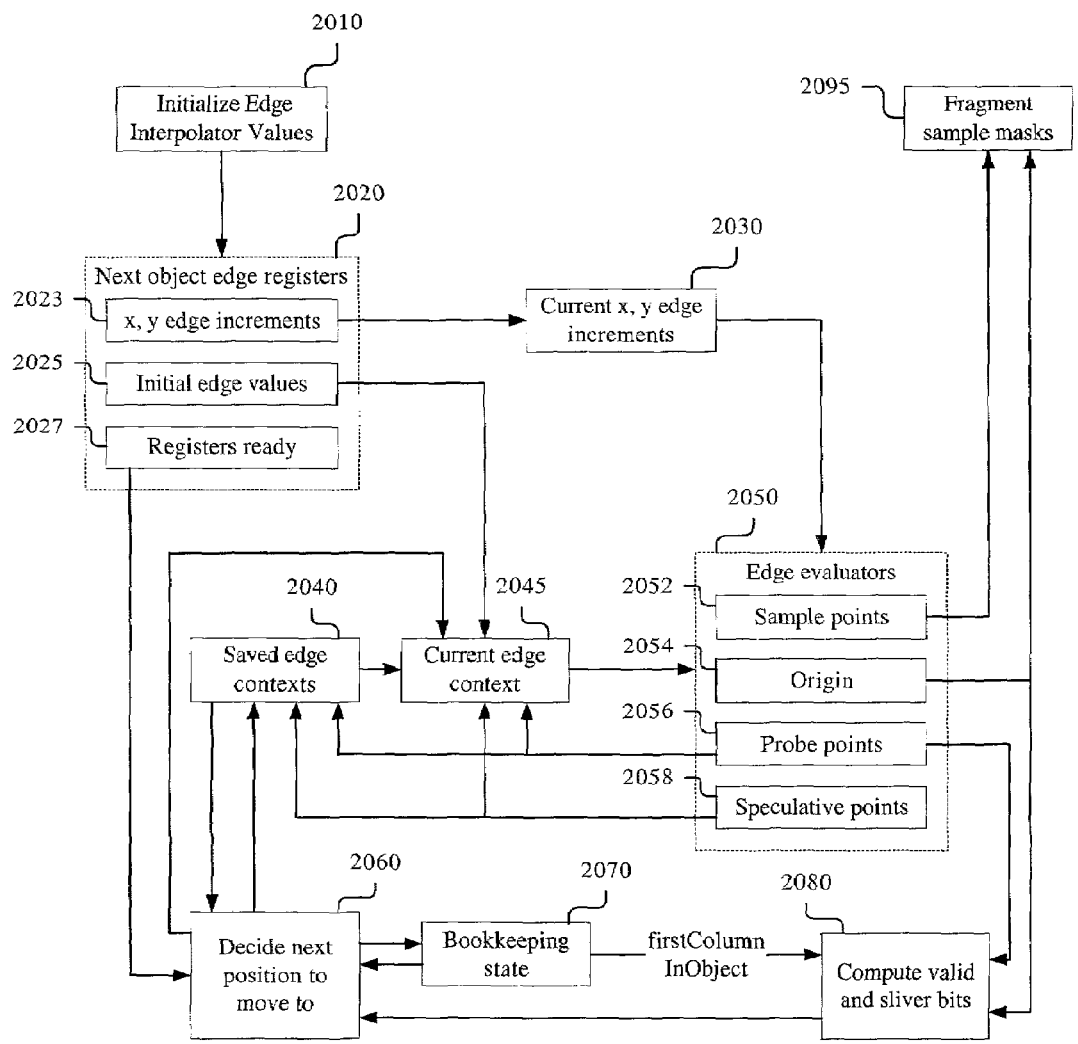
FIG. 20 is a diagram of a portion of the fragment generator of FIG. 19 that generates edge contexts.
Figure 21:
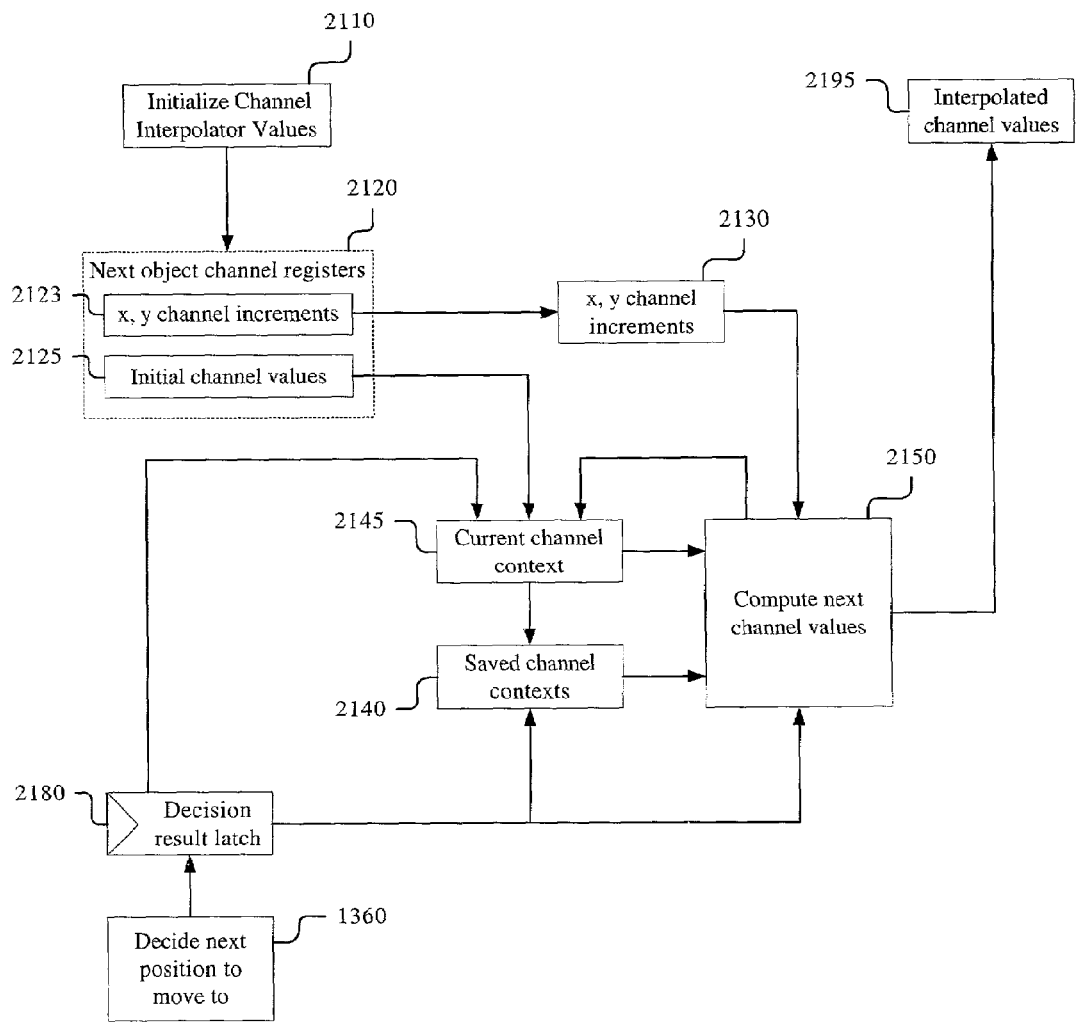
FIG. 21 is a diagram of a portion of the fragment generator of FIG. 19 that generates channel contexts.

FIGS. 20 and 21 show some of the circuitry of the fragment generator 1960. Edge initialization logic 2010 generates or provides edge and edge increment values for the next object to be rendered that are stored in a set of next object edge registers 2020. These registers 2020 include next object x and y edge increment registers 2023, and next object initial edge values registers 2025. Next object registers ready flag 2027 is enabled when registers 2025 and 2023 contain valid edge and edge increment values, and when registers 2125 and 2123 (FIG. 21), described below, contain valid channel and channel increment values. After one primitive object has been rendered, when the next object registers ready flag 2027 is set, the next object x and y edge increments 2023 are loaded into the current x and y edge increments 2030, and the next object initial edge values 2025 are loaded into the current edge context 2045.

Each of the saved contexts (described above in detail for the various embodiments) includes a saved edge context, stored in registers 2040, and a saved channel context, stored in registers 2140 (FIG. 21). A data structure representation of an edge context is shown in FIG. 23, and includes four edge function values plus a valid flag and a sliver flag. (The over contexts contain a productive flag rather than a sliver flag for the first embodiment that moves bidirectionally within a stampline.) Each of the edge function values represents the evaluation of a half-plane edge function at the origin of a stamp location. A data structure representation of a channel context is shown in FIG. 24, and includes color, transparency, depth, fog, texture coordinate, texture derivative and x and y coordinate values.

The current context includes the current edge context, stored in registers 2045, and the current channel context, stored in registers 2145 (FIG. 21).

Each of the three sparse contexts forward, back, and over includes only an edge context. The sparse edge contexts are not stored in registers 2040, but are generated by edge evaluators 2050

The current edge context 2045 and the current x and y edge increments 2030 are conveyed to a set of edge evaluators 2050. The edge evaluators 2050 are used to determine whether various points in and around the current stamp fall within the object being rendered. Each edge evaluator contains circuitry for evaluating a set of half-plane edge functions, by adding appropriate multiples of the current x and y edge increments 2030 for each edge to the edge values from the current edge context 2040. Each set of edge evaluators together determine whether a given (x, y) position of a pixel or sample point is within a specified object. Edge evaluation is described above with respect to step 1707 and 1707b.

There are edge evaluators 2052 for evaluating the sample points in the current stamp, an edge evaluator 2054 for the origin of the current stamp, edge evaluators 2056 for evaluating probe points around the current stamp, as well as edge evaluators 2058 for evaluating speculative points around the current stamp, in particular, the origin of the stamp positions immediately to the left and above the current position.

FIG. 22 depicts exemplary edge evaluation locations for a 4×2 stamp. The locations marked by X's are sample points in the stamp, the location marked by a circle is the origin of the stamp, the locations marked by diamonds are probe points, and the locations marked by a square are speculative points. The edge evaluators 2052 (FIG. 20) for all seven sample points, as well as the edge evaluator 2056 for probe point RB, compute only the sign bit of the half-plane functions, as these values are needed only for testing if points are inside the object being rendered. The edge evaluator 2058 for the speculative points SB and SO, as well as the edge evaluator 2056 for probe point LB and RT, compute the full half-plane function values, as these values may be loaded into the current edge context 2045 if the stamp movement decision circuitry 2060 moves the stamp back, over (when dirOver is NEGATIVE), forward, or over (when dirOver is POSITIVE), respectively. The origin edge evaluator 2054 passes the current edge context values 2045 through without modifying them.

The results generated by the origin and sample point edge evaluators 2054 and 2052, respectively, are used to form a fragment sample mask 2095. The mask is a set of bits indicating which sample points of the stamp fall within the object being rendered.

The results generated by the probe point edge evaluators 2056 are used by logic 2080 to compute valid, sliver, and productive bits. This logic is described above with respect to step 1707 and 1707b.

Stamp movement decision circuitry 2060 is described in detail above with respect to step 1709 and 1709b. This circuitry 2060 uses information from the saved edge contexts 2040, information from bookkeeping state circuitry 2070, and the valid, sliver, and productive bits from logic 2080. The stamp movement decision circuitry 2060 generates control signals for updating the saved edge contexts 2040, the current edge context 2045, and the bookkeeping state 2070. The stamp movement decision is also used by the channel context update circuitry shown in FIG. 21.

Channel initialization logic 2110 (FIG. 21) generates or provides initial channel and channel increment values that are stored in a set of next object channel registers 2120. These registers 2120 include next object x and y channel increment registers 2123, and next object initial channel value registers 2125. After one primitive object has been rendered, the next object x and y channel increments 2123 are loaded into the current x and y channel increments 2130, and the initial channel values 2125 are loaded into the current channel context 2045.

While the current edge context 2045 contains the edge values for the stamp origin during the current cycle, the current channel context 2145 contains the channel values for the stamp origin on the previous cycle. The current edge context 2045 is needed immediately in a cycle, so that the probe point edge evaluators 2056 can quickly deliver results to the stamp movement decision circuitry 2060. Between the probe point edge evaluators 2056 and the speculative point edge evaluators 2058, the edge functions are completely evaluated to their full precision for the four adjacent Manhattan stamp positions to which the stamp may immediately move. A similar arrangement for channels would require evaluating all channel values for these nearby positions, then multiplexing between these possibilities and the saved channel contexts using control signals from the stamp movement decision circuitry 2060. Unlike edge function values, channel values are not needed by stamp movement decision circuitry 2060, and so this arrangement wastefully evaluates channel values for positions that will not be moved to. To reduce the logic devoted to computing channel values, the logic in FIG. 20 delays computing channel values until after the stamp movement decision circuitry 2060 generates stable control signals. Allowing this channel computation to proceed in the same cycle in which the stamp movement decision is made would require increasing the cycle time of the logic shown in FIGS. 20 and 21. Instead, the channel computation logic in FIG. 21 saves the control signals from stamp movement decision circuitry 2060 (FIG. 20) in decision result latch 2180, and computes the channel values during the next cycle.

The compute next channel values logic 2150 selects channel data from the current channel context 2145 if the decision result latch 2180 indicates a move to an adjacent position, or from one of the saved channel contexts in registers 2140 if the decision result latch 2180 indicates a move to a saved position. The compute next channel values logic 2150 adds the appropriate multiples of the x and y channel increments 2130 to the selected context to compute the interpolated channel values 2195 and to load into the current channel context 2145 for use in the next cycle. If the decision result latch 2180 indicates that one or more adjacent position should be saved, the current channel context 2145 is loaded into the appropriate contexts in saved channel contexts 2140.

This invention is described using specific terms and examples. It is to be understood that various other adaptations and modifications may be made within the spirit and scope of the invention. Therefore, it is the object of the appended claims to cover all such variations and modifications as come within the true spirit and scope of the invention.

APPENDIX A

```
leftIntersect = Intersects (LEFT_TOP, LEFT_BOTTOM);
rightIntersect = Intersects (RIGHT_TOP, RIGHT_BOTTOM);
if (dirOver == NEGATIVE) {
    overValid = overInsideObject && leftIntersect;
    overProductive = overValid && Intersects (LEFT_TOP,
    LEFT_TOP);
} else {
    overValid = overInsideObject && rightIntersect;
    overProductive = overValid && Intersects (RIGHT_TOP,
    RIGHT_TOP);
}
downIntersect = Intersects (LOWER_LEFT, LOWER_RIGHT);
upIntersect = Intersects (UPPER_LEFT, UPPER_RIGHT);
rightForwardSliver =
    (((dirOver == NEGATIVE && firstColumnInObject) || (dirOver ==
POSITIVE))
        && Intersects (LOWER_RIGHT, RIGHT_BOTTOM));
leftForwardSliver =
    (dirOver == NEGATIVE && Intersects (LEFT_BOTTOM,
    LOWER_LEFT));
rightBackSliver =
    (((dirOver == NEGATIVE && firstColumnInObject)
|| (dirOver == POSITIVE)) && Intersects (UPPER_RIGHT,
RIGHT_TOP));
leftBackSliver =
    (dirOver == NEGATIVE && Intersects (LEFT_TOP,
    UPPER_LEFT));
forwardSliver = forwardInsideObject && (rightForwardSliver ||
leftForwardSliver)
    && !downIntersect;
backSliver = backInsideObject && (rightBackSliver || leftBackSliver)
    && !upIntersect;
forwardValid = (forwardInsideObject && downIntersect) || forwardSliver;
backValid = (backInsideObject && upIntersect) || backSliver;
```

APPENDIX B

```
if (overValid || overSaveValid) {
    // Invalidate all forward and back slivers, in both sparse and saved
    contexts
    if (forwardSliver) {
        forwardValid = forwardSliver = false;
    }
    if (backSliver) {
        backValid = backSliver = false;
    }
    if (backSaveSliver) {
        backSaveValid = backSaveSliver = false;
    }
}
```

APPENDIX C

```
goForward = goBackSave = goBack = goOver = goOverSave = false;
if (forwardValid && (dirForwardBack == POSITIVE)) {
    // forward is valid and we're already moving forward in this
    stampline.
    goForward = true;
    current = forward;
} else if (backSaveValid) {
    // Saved back position, so go back to it and then move backward
    through stampline
    goBackSave = true;
```

APPENDIX C-continued

```
       current = backSave;
} else if (backValid && (firstPositionInLine || (dirForwardBack ==
NEGATIVE)))
{
       // Back position valid, and either (1) we're at the first position in this
       // stampline (and no forward move), so we want to bypass directly to
       // back, or (2) we're already going backward in this stampline
       goBack = true;
       current = back;
} else if (overValid && (!overSaveValid || (!overSaveProductive &&
overProductive))) {
       // over valid, and either no saved over, or else over is superior to
       overSave.
       goOver = true;
       current = over;
} else if (overSaveValid) {
       // Saved over is valid, use it
       goOverSave = true;
       current = overSave;
} else {
       // We've generated all fragments within the object.
       Get new object and go to Step 1701;
}
```

APPENDIX D

```
// Any more positions to visit in this stampline?
moreInStampline = goForward || goBack || backSaveValid;
// Save back into backSave if it's valid, this is the first stamp position
// within the stampline, and we'll be moving forward
writeBackSave = backValid && firstPositionInLine && forwardValid;
if (goBackSave) {
       backSaveValid = false;
       backSaveSliver = false;
} else if (writeBackSave) {
       backSave = back;
       backSaveValid = true;
       backSaveSliver = backSliver;
}
// Save first over position found into overSave as long as we still have
// other positions to visit in this stampline (that is,
  we don't take the goOver bypass).
// Also allow replacement of overSave if it is not known productive and
over is.
writeOverSave = overValid && moreInStampline
       && (!overSaveValid || (!overSaveProductive && overProductive));
if (goOverSave) {
       overSaveValid = false;
       overSaveProductive = false;
} else if (writeOverSave) {
       overSave = over;
       overSaveValid = true;
       overSaveProductive = overProductive;
}
```

APPENDIX E

```
// Moving in forward direction in stampline unless we choose one of the
// two back moves
dirForwardBack = ((goBack || goBackSave) ? NEGATIVE : POSITIVE);
// If we moved over, we're at the first stamp position within a stampline
firstPositionInLine = (goOver || goOverSave);
// If we moved over, we're also no longer in the first column of the object,
// and the special sliver test should be disabled.
if (firstPositionInLine) {
       firstColumnInObject = false;
}
goto Step 1707;
```

APPENDIX F

```
goForward = goForwardSave = goBack = goBackSave = goOver = false;
if (overValid && !overSliver) {
       // over valid and not a sliver
```

APPENDIX F-continued

```
       goOver = true;
       current = over;
} else if (forwardSaveValid) {
       // Use the saved position
       goForwardSave = true;
       current = forwardSave;
} else if (forwardValid && dirForwardBack == POSITIVE) {
       // Use the bypass to move directly to forward position
       goForward = true;
       current = forward;
} else if (backSaveValid) {
       // Saved back position, so go back to it
       goBackSave = true;
       current = backSave;
} else if (backValid
       && (firstStamplineInObject || (dirForwardBack == NEGATIVE))) {
       // Back position valid, and either (1) we're on the first
       // stampline (and no forward move), so we want to bypass directly to
       // back, or (2) we're already going backward in this stampline
       goBack = true;
       current = back;
} else if (overValid) {
       // This is a sliver, but didn't find anything better to do, and we might
       // find a good forward position eventually if we go over.
       goOver = true;
       current = over;
} else {
       load new object and go to Step 1701; // Nothing left to do in this
       object
}
```

APPENDIX G

```
writeBackSave = backValid && !backSaveValid && !goBack
       && (firstStamplineInObject || dirForwardBack == NEGATIVE);
if (goBackSave) {
       backSaveValid = false;
       backSaveSliver = false;
} else if (writeBackSave) {
       backSave = back;
       backSaveValid = true;
       backSaveSliver = backSliver;
}
writeForwardSave = forwardValid && !forwardSaveValid &&
!goForward
       && dirForwardBack == POSITIVE;
if (goForwardSave) {
       forwardSaveValid = false;
       forwardSaveSliver = false;
} else if (writeForwardSave) {
       forwardSave = forward;
       forwardSaveValid = true;
       forwardSaveSliver = forwardSliver;
}
if (goForward || goForwardSave) {
       backSaveSliver = false;
} else if (goBack || goBackSave) {
       forwardSaveSliver = false;
}
```

APPENDIX H

```
// Moving in forward direction in stampline unless we choose one of the
// two back moves
dirForwardBack = ((goBack || goBackSave) ? NEGATIVE : POSITIVE);
if (goOver) {
       // If we moved over, we're also no longer in the first column of the
       // object, and the special sliver test should be disabled.
       firstColumnInObject = false;
} else {
       // Otherwise we are no longer on the first stampline
       firstStamplineInObject = false;
}
goto Step 1707b;
```

What is claimed is:

1. A method of traversing pixels of a graphic object with a fragment stamp, the fragment stamp having a plurality of probe points, the graphic object being defined with respect to an array of pixels that is divided into an array of contiguous but non-overlapping stamp positions at which the fragment stamp can be placed, the method comprising, at a current one of the stamp positions, evaluating whether a plurality of stamp positions that are adjacent to the current stamp position are valid positions, wherein the evaluating step further comprises determining, at the current stamp position, whether a segment formed by two of the probe points intersects the graphic object and wherein at least one of the two probe points are exterior to the current stamp position, the evaluating step further comprising determining whether a stamp position is a sliver position, a sliver position being a valid position that will not generate an additional valid position, and further comprising avoiding movement of the current stamp position to a sliver position if additional valid positions are available.

2. The method of claim 1 wherein the evaluating step includes: generating sliver information indicative of whether a plurality of the stamp positions adjacent to the current stamp position are sliver positions.

3. The method of claim 2 further comprising: based at least in part on the sliver information, moving the fragment stamp to a next one of the stamp positions.

4. The method of claim 1 wherein the evaluating step comprises: determining whether a forward stamp position adjacent to the current stamp position is a sliver position; determining whether a back stamp position adjacent to the current stamp position is a sliver position; and determining whether an over stamp position adjacent to the current stamp position is a valid position.

5. The method of claim 4, wherein the evaluating step further comprises determining whether the over stamp position is a sliver position.

6. The method of claim 1 further comprising, based at least in part on the results of the evaluating step and based at least in part on previously saved context information, moving the fragment stamp from the current stamp position to a next one of the stamp positions.

7. The method of claim 6 wherein the moving step further comprises, based at least in part on the results of the evaluating step, restoring from a stamp context a previously saved stamp position so as to position the stamp in another stamp position.

8. The method of claim 6 wherein the moving step comprises: moving the fragment stamp to one of an unvisited non-sliver valid forward stamp position and an unvisited non-sliver valid back stamp position, if any such stamp position exists; otherwise moving the fragment stamp to an unvisited valid over stamp position, if any such stamp position exists; and otherwise moving the fragment stamp to one of an unvisited sliver forward stamp position and an unvisited sliver back stamp position, if any such stamp position exists.

9. The method of claim 8, wherein any one of the unvisited non-sliver valid forward stamp position, the unvisited non-sliver valid back stamp position, the unvisited valid over stamp position, the unvisited sliver forward stamp position and the unvisited sliver back stamp positions is either a stamp position adjacent to the current stamp position or a stamp position previously stored in one of a plurality of stamp contexts.

10. The method of claim 8, wherein any one of the unvisited non-sliver valid back stamp position, the unvisited valid over stamp position and the unvisited sliver back stamp positions is either a stamp position adjacent to the current stamp position or a stamp position previously stored in one of a plurality of stamp contexts, and wherein any one of the unvisited non-sliver valid forward stamp position and the unvisited sliver forward stamp position is a stamp position adjacent to the current stamp position.

11. The method of claim 6 wherein the moving step comprises: moving the fragment stamp to an unvisited valid over stamp position, if any such stamp position exists; otherwise moving the fragment stamp to an unvisited valid forward stamp position, if any such stamp position exists; and otherwise moving the fragment stamp to a sliver forward stamp position, if any such stamp position exists.

12. The method of claim 11, wherein any one of the unvisited non-sliver valid forward stamp position, the unvisited valid over stamp position, and the unvisited sliver forward stamp position is either a stamp position adjacent to the current stamp position or a stamp position previously stored in one of a plurality of stamp contexts.

13. The method of claim 11, wherein any one of the unvisited non-sliver valid forward stamp position, and the unvisited sliver forward stamp position is either a stamp position adjacent to the current stamp position or a stamp position previously stored in one of a plurality of stamp contexts; and wherein the unvisited valid over stamp position is a stamp position adjacent to the current stamp position.

14. The method of claim 6 wherein the moving step comprises: moving the fragment stamp to an unvisited valid over stamp position, if any such stamp position exists; otherwise moving the fragment stamp to an unvisited non-sliver valid back stamp position, if any such stamp position exists; and otherwise moving the fragment stamp to an unvisited sliver back stamp position, if any such position exists.

15. The method of claim 14 wherein any one of the unvisited non-sliver valid back stamp position, the unvisited valid over stamp position, and the unvisited sliver back stamp positions is either a stamp position adjacent to the current stamp position or a stamp position previously stored in one of a plurality of stamp contexts.

16. The method of claim 14 wherein any one of the unvisited non-sliver valid back stamp position, and the unvisited sliver back stamp positions is either a stamp position adjacent to the current stamp position or a stamp position previously stored in one of a plurality of stamp contexts, and wherein the unvisited valid over stamp position is a stamp position adjacent to the current stamp position.

17. The method of claim 6 wherein the moving step comprises: moving the fragment stamp to an unvisited valid non-sliver over stamp position, if any such stamp position exists; otherwise moving the fragment stamp to an unvisited non-sliver valid forward stamp position, if any such stamp position exists and if a first predetermined condition is satisfied; otherwise moving the fragment stamp to an unvisited non-sliver valid back stamp position, if any such stamp position exists and if a second predetermined condition is satisfied; otherwise moving the fragment stamp to an unvisited sliver over stamp position, if any such stamp position exists; otherwise moving the fragment stamp to an unvisited sliver forward stamp position, if any such stamp position exists and if a third predetermined condition is satisfied; and otherwise moving the fragment stamp to an unvisited sliver back stamp position, if any such stamp position exists and if a fourth predetermined condition is satisfied.

18. The method of claim 17 wherein any one of the unvisited non-sliver valid forward stamp position, the unvisited non-sliver valid back stamp position, the unvisited non-sliver valid over stamp position, the unvisited sliver forward stamp position, the unvisited sliver back stamp position, and the unvisited sliver over stamp positions is either a stamp position adjacent to the current stamp position or a stamp position previously stored in one of a plurality of stamp contexts.

19. The method of claim 17 wherein any one of the unvisited non-sliver valid forward stamp position, the unvisited non-sliver valid back stamp position, the unvisited sliver forward stamp position, and the unvisited sliver back stamp position is either a stamp position adjacent to the current stamp position or a stamp position previously stored in one of a plurality of stamp contexts; and any one of the unvisited non-sliver valid over stamp position and the unvisited sliver over stamp position is a stamp position adjacent to the current stamp position.

20. The method of claim 1 further comprising, based at least in part on the results of the evaluating step, saving information associated with a stamp position that is adjacent to a current stamp position into a corresponding stamp context of a plurality of stamp contexts; the saved information including said stamp position.

21. The method of claim 20 wherein the saved information further comprises sliver information.

22. The method of claim 1 wherein the stamp comprises a rectangle having a top edge, a bottom edge, a left edge and a right edge, and wherein the probes external to the stamp are placed such that: all probes above the top edge are no farther above said top edge than the lowest sample point in the stamp is from the bottom edge; all probes below the bottom edge are no farther below said bottom edge than the highest sample point in the stamp is from the top edge; all probes to the left of the left edge are no farther to the left of said left edge than the rightmost sample point in the stamp is from the right edge; all probes to the right of the right edge are no farther to the right of said right edge than the leftmost sample point in the stamp is from the left edge.

23. The method of claim 1 wherein the stamp is a rectangle having a top edge, a bottom edge, a left edge and a right edge, and wherein the probes points external to the stamp are placed such that a segment between the probes points that is evaluated for intersection with the graphics object in order to compute valid or sliver bits satisfies the following constraints: the stamp position immediately above has no sample point below said segment; the stamp position immediately below has no sample point above said segment; the stamp position immediately to the left has no sample point to the right of said segment; the stamp position immediately to the right has no sample point to the left of said segment.

24. The method of claim 1 wherein at least one probe point is asymmetrically placed around the fragment stamp.

25. The method of claim 1 wherein at least one probe point is asymmetrically placed outside of the fragment stamp.

26. The method of claim 1 wherein at least one probe point is located around the fragment stamp but not at vertices of the fragment stamp.

27. The method of claim 1 wherein a plurality probe points are located around the fragment stamp, including locations other than vertices.

28. The method of claim 1 wherein both of the two probe points are exterior to the current stamp position and exterior to the fragment stamp.

29. A method of traversing pixels of a graphic object with a fragment stamp, the fragment stamp having a plurality of probe points, the graphic object being defined with respect to an array of pixels that is divided into an array of contiguous but non-overlapping stamp positions at which the fragment stamp can be placed, the method comprising, at a current one of the stamp positions, evaluating whether a plurality of stamp positions that are adjacent to the current stamp position are valid positions, wherein the evaluating step further comprises determining, at the current stamp position, whether a segment formed by two of the probe points intersects the graphic object and wherein at least one of the two probe points are exterior to the current stamp position, and further comprising saving the over stamp position in an oversave stamp context when the over stamp position is valid and known to be productive, and when said oversave stamp context does not already contain a stamp position that is known to be productive, wherein the evaluating step includes: determining whether an over stamp position adjacent to the current stamp position is a valid position; and determining whether the over stamp position is a productive position by determining whether one or more sample points of the stamp will be contained within the graphics object when the stamp is placed in the over stamp position.

30. A method of traversing pixels of a graphic object with a fragment stamp, the fragment stamp having a plurality of probe points, the graphic object being defined with respect to an array of pixels that is divided into an array of contiguous but non-overlapping stamp positions at which the fragment stamp can be placed, the method comprising, at a current one of the stamp positions, evaluating whether a plurality of stamp positions that are adjacent to the current stamp position are valid positions, wherein the evaluating step further comprises determining, at the current stamp position, whether a segment formed by two of the probe points intersects the graphic object and wherein at least one of the two probe points are exterior to the current stamp position, wherein the evaluating step comprises: determining whether a forward stamp position adjacent to the current stamp position is a sliver position; determining whether a back stamp position adjacent to the current stamp position is a sliver position; determining whether an over stamp position adjacent to the current stamp position is a valid position; and making a sliver back stamp position invalid if the over stamp position is valid.

31. The method of claim 30, wherein the back stamp position and the over stamp position are adjacent to the current stamp position or a stamp position previously stored in one of a plurality of stamp contexts.

32. A method of traversing pixels of a graphic object with a fragment stamp, the fragment stamp having a plurality of probe points, the graphic object being defined with respect to an array of pixels that is divided into an array of contiguous but non-overlapping stamp positions at which the fragment stamp can be placed, the method comprising, at a current one of the stamp positions, evaluating whether a plurality of stamp positions that are adjacent to the current stamp position are valid positions, wherein the evaluating step further comprises determining, at the current stamp position, whether a segment formed by two of the probe points intersects the graphic object and wherein at least one of the two probe points are exterior to the current stamp position, wherein the evaluating step comprises: determining whether a forward stamp position adjacent to the current stamp position is a sliver position; determining whether a back stamp position adjacent to the current stamp position is a sliver position; determining whether an over stamp position adjacent to the current stamp position is a valid position; and making a sliver forward stamp position invalid if the over stamp position is valid.

33. The method of claim 32, where forward stamp position and the over stamp position are adjacent to the current stamp position or a stamp position previously stored in one of a plurality of stamp contexts.

34. A method of traversing pixels of a graphic object with a fragment stamp, the fragment stamp having a plurality of probe points, the graphic object being defined with respect to an array of pixels that is divided into an array of contiguous but non-overlapping stamp positions at which the fragment stamp can be placed, the method comprising, at a current one of the stamp positions, evaluating whether a plurality of stamp positions that are adjacent to the current stamp position are valid positions, wherein the evaluating step further comprises determining, at the current stamp position, whether a segment formed by two of the probe points intersects the graphic object and wherein at least one of the two probe points are exterior to the current stamp position, further comprising when a first plurality of predetermined conditions are satisfied, placing the stamp at a starting stamp position that includes a top-most vertex of the graphics object; when a second plurality of predetermined conditions are satisfied, placing the stamp at a starting stamp position that includes a bottom-most vertex of the graphics object; if a distance from a top-most sample point to a top edge of the stamp is larger than a distance from the bottom-most sample point to a bottom edge of the stamp rectangle, placing the stamp at the starting stamp position that includes the top-most vertex of the graphics object; and otherwise, placing the stamp at the starting stamp position that includes the bottom-most vertex of the graphics object.

35. A method of traversing pixels of a graphic object with a fragment stamp, the fragment stamp having a plurality of probe points, the graphic object being defined with respect to an array of pixels that is divided into an array of contiguous but non-overlapping stamp positions at which the fragment stamp can be placed, the method comprising, at a current one of the stamp positions, evaluating whether a plurality of stamp positions that are adjacent to the current stamp position are valid positions, wherein the evaluating step further comprises determining, at the current stamp position, whether a segment formed by two of the probe points intersects the graphic object and wherein at least one of the two probe points are exterior to the current stamp position, wherein when a first plurality of predetermined conditions are satisfied, placing the stamp at a starting stamp position that includes a left-most vertex of the graphics object; when a second plurality of predetermined conditions are satisfied, placing the stamp at a starting stamp position that includes a right-most vertex of the graphics object; and if the distance from a left-most sample point to a left edge of the stamp is larger than the distance from a right-most sample point to a right edge of the stamp rectangle, placing the stamp at the starting stamp position that includes the left-most vertex of the graphics object, otherwise placing the stamp at the starting stamp position that includes the right-most vertex of the graphics object.

36. A graphics processor for rendering an image including a graphic object, the graphic object being defined with respect to an array of pixels that is divided into an array of stamp positions, the graphics processor comprising: a frame buffer memory configured to store information associated with the graphic object; graphics circuitry configured to render the graphic object with a fragment stamp one stamp position at a time, the fragment stamp having a plurality of probe points; stamp control logic configured to set a current stamp position of the fragment stamp, wherein said stamp control logic generates validity information indicative of whether a plurality of stamp positions that are adjacent to the current stamp position are valid positions, wherein the stamp control logic generates the validity information based at least in part on determining, at the current stamp position, whether a segment formed by two of the probe points intersects the graphic object, at least one of the two probe points being exterior to the current stamp position, the evaluating step further comprising determining whether a stamp position is a sliver position, a sliver position being a valid position that will not generate an additional valid position, wherein at least one probe point is asymmetrically placed around the fragment stamp.

37. The graphics processor of claim 36 wherein the stamp control logic is configured to generate sliver information indicative of whether the plurality of the stamp positions adjacent to the current stamp position are sliver positions.

38. The graphics processor of claim 37 wherein the stamp control logic moves the fragment stamp from the current stamp position to a next one of the stamp positions based at least in part on the sliver information and based at least in part on previously saved context information.

39. The graphics processor of claim 36, wherein the stamp control logic is configured to: determine whether a forward stamp position adjacent to a current stamp position is a sliver position; determine whether a back stamp position adjacent to the current stamp position is a sliver position; and determine whether an over stamp position adjacent to the current stamp position is a valid position.

40. The graphics processor of claim 36 wherein the stamp control logic restores from a stamp context a previously saved stamp position so as to position the stamp in another stamp position, wherein the stamp control logic restores the previously saved stamp position based at least in part on the validity information and based at least in part on previously saved context information.

41. The method of claim 36 wherein at least one probe point is asymmetrically placed outside of the fragment stamp.

42. The method of claim 36 wherein at least one probe point is located around the fragment stamp but not at vertices of the fragment stamp.

43. The method of claim 36 wherein a plurality probe points are located around the fragment stamp, including locations other than vertices.

44. The method of claim 36 further comprising avoiding movement of the current stamp position to a sliver position if additional valid positions are available.

45. The method of claim 36 wherein both of the two probe points are exterior to the current stamp position and exterior to the fragment stamp.

46. A graphics processor for rendering an image including a graphic object, the graphic object being defined with respect to an array of pixels that is divided into an array of stamp positions, the graphics processor comprising: a frame buffer memory configured to store information associated with the graphic object; graphics circuitry configured to render the graphic object with a fragment stamp one stamp position at a time, the fragment stamp having a plurality of probe points; stamp control logic configured to set a current stamp position of the fragment stamp, wherein said stamp control logic generates validity information indicative of whether a plurality of stamp positions that are adjacent to the current stamp position are valid positions, wherein the stamp control logic generates the validity information based at least in part on determining, at the current stamp position, whether a segment formed by two of the probe points intersects the graphic object, at least one of the two probe points being exterior to the current stamp position, wherein the stamp control logic saves the over stamp position in an oversave stamp context when the over stamp position is valid and known to be productive, and when said oversave stamp context does not already contain a stamp position that is known to be productive.

* * * * *